(12) United States Patent
Isobe et al.

(10) Patent No.: US 11,492,452 B2
(45) Date of Patent: Nov. 8, 2022

(54) MULTI-BLOCK COPOLYMER COMPOSITION OBTAINED BY MODIFICATION TREATMENT, AND FILM

(71) Applicants: ZEON CORPORATION, Tokyo (JP); NATIONAL UNIVERSITY CORPORATION NAGOYA UNIVERSITY, Nagoya (JP)

(72) Inventors: Kousuke Isobe, Tokyo (JP); Sadaharu Hashimoto, Tokyo (JP); Atsushi Nozawa, Tokyo (JP); Atsushi Noro, Nagoya (JP); Takato Kajita, Nagoya (JP); Yushu Matsushita, Nagoya (JP)

(73) Assignees: ZEON CORPORATION, Tokyo (JP); NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 371 days.

(21) Appl. No.: 16/642,897

(22) PCT Filed: Aug. 23, 2018

(86) PCT No.: PCT/JP2018/031200
§ 371 (c)(1),
(2) Date: Feb. 28, 2020

(87) PCT Pub. No.: WO2019/044660
PCT Pub. Date: Mar. 7, 2019

(65) Prior Publication Data
US 2020/0255607 A1 Aug. 13, 2020

(30) Foreign Application Priority Data
Aug. 31, 2017 (JP) .............................. JP2017-167040

(51) Int. Cl.
*C08F 297/04* (2006.01)
*C08J 5/18* (2006.01)
*C08F 297/08* (2006.01)

(52) U.S. Cl.
CPC ............... *C08J 5/18* (2013.01); *C08F 297/08* (2013.01); *C08F 2420/00* (2013.01); *C08F 2500/26* (2013.01); *C08J 2325/08* (2013.01)

(58) Field of Classification Search
CPC ...... C08J 2353/02; C08J 2335/06; C08J 5/18; C08F 297/04
See application file for complete search history.

(56) References Cited

U.S. PATENT DOCUMENTS

| 8,470,929 B2* | 6/2013 | Ooishi | C08J 5/18 |
| | | | 525/271 |
| 8,722,800 B2* | 5/2014 | Oda | C08L 53/02 |
| | | | 525/89 |
| 2020/0062948 A1 | 2/2020 | Isobe et al. | |

FOREIGN PATENT DOCUMENTS

| GB | 2035331 A | 6/1980 |
| JP | S5483091 A | 7/1979 |

(Continued)

OTHER PUBLICATIONS

Mar. 3, 2020, International Preliminary Report on Patentability issued in the International Patent Application No. PCT/JP2018/031200.

*Primary Examiner* — Caixia Lu
(74) *Attorney, Agent, or Firm* — Kenja IP Law PC

(57) ABSTRACT

A main purpose of the present invention is to provide a multi-block copolymer composition having good elasticity and excellent stress relaxation properties, as well as small tension set. The present invention achieves the purpose by providing a multi-block copolymer composition obtained by a modification treatment, the composition including a block (Continued)

copolymer B formed by introducing a functional group capable of forming a non-covalent bond to a block copolymer A; wherein the block copolymer A includes a block copolymer A1 having a specific primary structure and a block copolymer A2 having a specific primary structure, and the mass ratio (A1/A2) of the block copolymer A1 and the block copolymer A2 is 100/0 to 50/50.

7 Claims, 3 Drawing Sheets

(56) References Cited

FOREIGN PATENT DOCUMENTS

| | | |
|---|---|---|
| JP | S54146889 A | 11/1979 |
| JP | S56115307 A | 9/1981 |
| JP | S56116702 A | 9/1981 |
| JP | S56120753 A | 9/1981 |
| JP | S6243411 A | 2/1987 |
| JP | S62181307 A | 8/1987 |
| JP | 2016089099 A | 5/2016 |
| WO | 2018207683 A1 | 11/2018 |

* cited by examiner

Original size    1300%    Right after releasing stress    9 h    24 h    47 h

MULTI-BLOCK COPOLYMER COMPOSITION OBTAINED BY MODIFICATION TREATMENT, AND FILM

TECHNICAL FIELD

The present invention relates to a multi-block copolymer composition containing a multi-block copolymer that includes an aromatic vinyl polymer block and a conjugated diene polymer block, in further details, relates to the multi-block copolymer composition which has good elasticity and excellent stress relaxation properties, as well as small tension set.

BACKGROUND ART

A thermoplastic elastomer has been utilized in various fields as a flexible material since it exhibits rubber elasticity at a room temperature and the mold fabrication thereof is easy since it is softened and exhibits fluidity when heated.

On the occasion of using the thermoplastic elastomer as a flexible material in various applications, both of comparatively high elasticity and small tension set are required. Accordingly, various studies have been conducted in order to improve the properties of the thermoplastic elastomer.

For example, as disclosed in Patent Literature 1, a part of the inventors of the present application have been reported that elastic properties such as breaking elongation, maximum stress, and toughness have been improved when, in an elastomer including a block copolymer comprising A chain: a hard polymer chain which is in a glass state in the vicinity of room temperature, and B chain: a soft chain which is in a melted state in the vicinity of room temperature, a monomer including a functional group capable of forming a non-covalent bond is brought to be included in a polymerized state in the B chain, so as monomer components form non-covalent bonds among and in molecules to form Physical cross-linking.

Meanwhile, the thermoplastic elastomer is required to have excellent stress relaxation properties. Large residual stress when a pressure is applied and deformed means that the force of attempting to be back in an original form is large. When the stress relaxation properties are inferior, comparatively large residual stress is continuously applied on the occasion of applying the thermoplastic elastomer to various parts, which easily cause peel-off and breakdown. Thus, decreasing the applied pressure so as to minimize the residual pressure, that is to have excellent stress relaxation properties, is also required.

Therefore, regarding the thermoplastic elastomer, further improvement has been desired from the viewpoint of achieving the high levels of elasticity, tension set and stress relaxation properties.

CITATION LIST

Patent Literature

Patent Literature 1: Japanese Patent Application Laid-Open (JP-A) No. 2016-89099

SUMMARY OF INVENTION

Technical Problem

The present invention has been made in view of the above circumstances and a main object thereof is to provide a multi-block copolymer composition which has good elasticity and excellent stress relaxation properties, as well as small tension set.

Solution to Problem

The inventors of the present invention conducted a thorough investigation in order to achieve the object; as the result, they have found out that the high levels of elasticity, tension set and stress relaxation properties may be achieved when a block copolymer including an aromatic vinyl polymer block and a conjugated diene polymer block, that has particularly good elasticity and flexible among thermoplastic elastomers, the block copolymer (mixture) containing a specific composition of an aromatic vinyl-conjugated diene multi-block copolymer having a specific primary structure and an aromatic vinyl-conjugated diene diblock copolymer having a specific primary structure, is used, and a functional group capable of forming a non-covalent bond is introduced to the block copolymer (mixture), and the present invention has been completed based on this finding.

Thus, the present invention provides a multi-block copolymer composition obtained by a modification treatment, the composition characterized by comprising: a block copolymer B formed by introducing a functional group capable of forming a non-covalent bond to a block copolymer A; wherein the block copolymer A includes a block copolymer A1 represented by the following formula I, and a block copolymer A2 represented by the following formula II; and a mass ratio (A1/A2) of the block copolymer A1 and the block copolymer A2 is 100/0 to 50/50:

$(Ar^a\text{-}D^a)_n\text{-}X$ (I)

$Ar^b\text{-}D^b$ (II)

(in the formulas, $Ar^a$ and $Ar^b$ each represents an aromatic vinyl polymer block of which weight average molecular weight is 3,000 to 25,000; $D^a$ represents a conjugated diene polymer block of which vinyl bond content is 0.1 mol % to 50 mol % and weight average molecular weight is 5,000 to 250,000; $D^b$ represents a conjugated diene polymer block of which vinyl bond content is 0.1 mol % to 50 mol % and weight average molecular weight is 5,000 to 500,000; X represents a single bond or a residue of a coupling agent; and n is an integer of 2 or more).

The block copolymer A may further include a block copolymer A3 represented by the following formula III:

$Ar1^c\text{-}D^c\text{-}Ar2^c$ (III)

(in the formula, $Ar1^c$ represents an aromatic vinyl polymer block of which weight average molecular weight is 3,000 to 25,000; $Ar2^c$ represents an aromatic vinyl polymer block of which weight average molecular weight is 30,000 to 300,000; and $D^c$ represents a conjugated diene polymer block of which vinyl bond content is 0.1 mol % to 50 mol % and weight average molecular weight is 10,000 to 500,000).

It is preferable that a mass ratio [(A1+A3)/A2] of the block copolymer A1, the block copolymer A2, and the block copolymer A3 is 100/0 to 50/50.

It is preferable that the functional group capable of forming a non-covalent bond is a group formed by bringing an amine compound into reaction with an acid anhydride group introduced to the block copolymer A.

It is preferable that an introduction rate of the functional group capable of forming a non-covalent bond to the block copolymer B per 100 mol % of a conjugated diene monomer unit in the block copolymer B is 2.5 mol % to 25 mol %.

The present invention also provides a film comprising 0 to 40 parts by mass of an aromatic vinyl polymer and 0 to 20 parts by mass of a polyolefin-based thermoplastic resin per 100 parts by mass of the above described multi-block copolymer composition.

It is preferable that, when the film is stretched to 1300% strain and kept as it is for 47 hours, then a tensile load thereto is released, and left as it is for 47 hours, a recovery of the film is 60% or more.

Advantageous Effects of Invention

The present invention exhibits an effect of providing a multi-block copolymer composition which has good elasticity and excellent stress relaxation properties, as well as small tension set.

DESCRIPTION OF EMBODIMENTS

Figure 1:
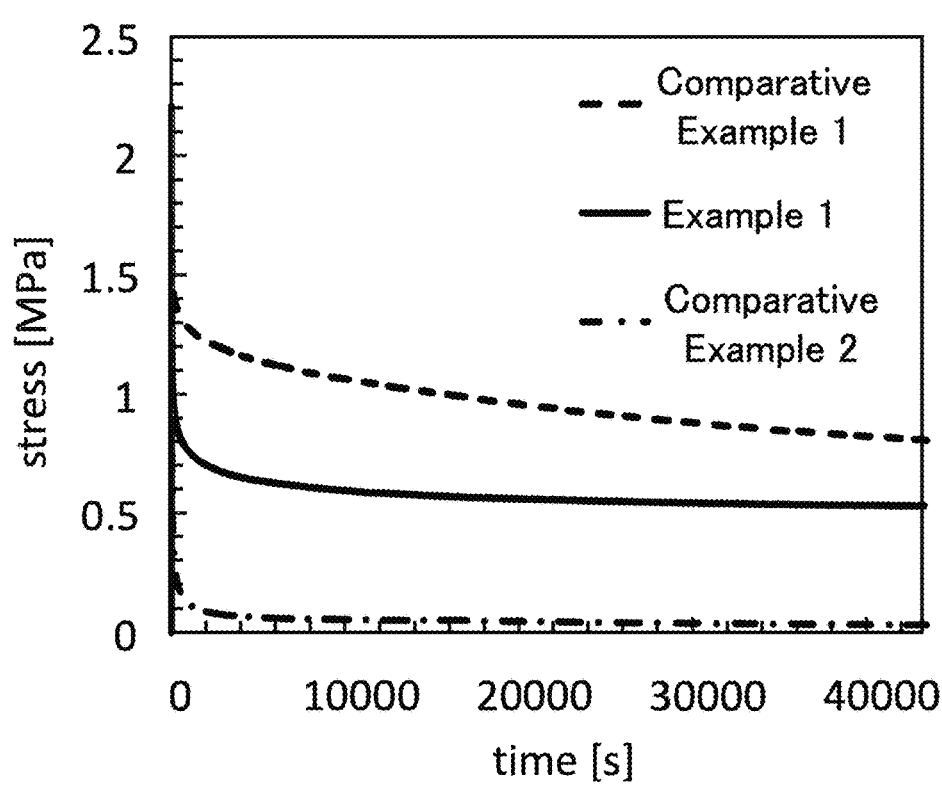
FIG. 1 is a graph showing the result of stress relaxation test with the strain of 500% to Examples and Comparative Examples.

The multi-block copolymer composition obtained by modification treatment, and the film using thereof of the present invention are hereinafter explained in details.

A. Multi-Block Copolymer Composition Obtained by Modification Treatment

The multi-block copolymer composition obtained by a modification treatment of the present invention is a composition comprising: a block copolymer B formed by introducing a functional group capable of forming a non-covalent bond to a block copolymer A; wherein the block copolymer A includes a block copolymer A1 represented by the following formula I, and a block copolymer A2 represented by the following formula II; and a mass ratio (A1/A2) of the block copolymer A1 and the block copolymer A2 is 100/0 to 50/50:

  (I)

  (II)

(in the formulas, $Ar^a$ and $Ar^b$ each represents an aromatic vinyl polymer block of which weight average molecular weight is 3,000 to 25,000; $D^a$ represents a conjugated diene polymer block of which vinyl bond content is 0.1 mol % to 50 mol % and weight average molecular weight is 5,000 to 250,000; $D^b$ represents a conjugated diene polymer block of which vinyl bond content is 0.1 mol % to 50 mol % and weight average molecular weight is 5,000 to 500,000; X represents a single bond or a residue of a coupling agent; and n is an integer of 2 or more).

Incidentally, "the multi-block copolymer composition obtained by a modification treatment" may be simply referred to as "the block copolymer composition" in some cases.

According to the present invention, the block copolymer B includes the functional group capable of forming a non-covalent bond and thus a non-covalent bond may be formed among polymer chains using the functional group capable of forming a non-covalent bond to form a Physical-crosslinking. The non-covalent bond is capable of detachment and recombination, and thus the block copolymer composition of the present invention is capable of achieving different properties from those of conventional block copolymer compositions. The block copolymer composition of the present invention exhibits fluidity at a high temperature since the aromatic vinyl polymer block in the block copolymer melts, but it exhibits elasticity at a room temperature since the aromatic vinyl polymer block in the block copolymer is vitrified to become a physical crosslinking point. The non-covalent bond using the functional group capable of forming a non-covalent bond works as a non-covalent bond crosslinking point along with a physical crosslinking point formed by the aromatic vinyl polymer block in the block copolymer, and thus the elasticity of the block copolymer composition may be maintained or improved. Meanwhile, when stress or strain is applied, in principle, the stress may be dispersed as much as the non-covalent bond crosslinking points has increased, and also, the stress may be relaxed when the functional group capable of forming a non-covalent bond is recombined, and thus the physical crosslinking point may be protected. In other words, even when the stress relaxation occurs, the physical crosslinking point is maintained, and thus the elastic degradation can be suppressed. Therefore, both good elasticity and excellent stress relaxation may be achieved. Also, the physical crosslinking point is protected and thus the tension set may be reduced, and both high elastic modulus and a small tension set may be achieved with a high level of compatibility.

Also, according to the present invention, the block copolymer A includes the block copolymer A1 that is an aromatic vinyl-conjugated diene multi-block copolymer having a specific primary structure represented by the formula I, and the block copolymer A2 that is an aromatic vinyl-conjugated diene diblock copolymer having a specific primary structure represented by the formula II in a specific mass ratio, and thus high elasticity and small tension set may be obtained.

Then, the block copolymer B is formed by introducing a functional group capable of forming a non-covalent bond into the block copolymer A, and thus high elasticity and small tension set of the block copolymer A may be maintained. On the other hand, in the case of copolymerizing a monomer including a functional group capable of forming a non-covalent bond, the copolymerization itself is difficult, and the desired block copolymer, in other words, the block copolymer that exhibits high elasticity and flexibility may not be obtained in some cases.

1. Block Copolymer B

The block copolymer B used in the present invention is formed by introducing a functional group capable of forming a non-covalent bond into a block copolymer A. The block copolymer B is used as a polymer component in the block copolymer composition of the present invention.

Incidentally, in the present specification, "block copolymer" is meant to include any forms of a pure block copolymer, a random block copolymer, and a copolymer having a taper block structure, unless otherwise explained.

(1) Block Copolymer A

The block copolymer A includes the block copolymer A1 represented by the below formula I and the block copolymer A2 represented by the below formula II in a specific mass ratio:

  (I)

  (II).

As shown in the formula I, the block copolymer A1 is an aromatic vinyl-conjugated diene multi-block copolymer configured such that two or more of a diblock formed by the bond of an aromatic vinyl polymer block having a specific weight average molecular weight with a conjugated diene polymer block having a specific vinyl content and weight average molecular weight are bonded directly in a single bond or via the residue of a coupling agent.

In the formula I, $Ar^a$ is an aromatic vinyl polymer block of which weight average molecular weight is 3,000 to 25,000, and $D^a$ is a conjugated diene polymer block of which vinyl bond content is 0.1 mol % to 50 mol % and weight average molecular weight is 5,000 to 250,000. X is a single bond or the residue of a coupling agent, and n is an integer of 2 or more.

As shown in the formula II, the block copolymer A2 is an aromatic vinyl-conjugated diene diblock copolymer configured by the bond of an aromatic vinyl copolymer block having a specific weight average molecular weight with a conjugated diene polymer block having a specific vinyl bond content and a specific weight average molecular weight.

In the formula II, $Ar^b$ is an aromatic vinyl polymer block of which weight average molecular weight is 3,000 to 25,000, and $D^b$ is a conjugated diene polymer block of which vinyl bond content is 0.1 to 50 mol % and weight average molecular weight is 5,000 to 500,000.

The aromatic vinyl polymer block ($Ar^a$ and $Ar^b$) in the block copolymer A1 and the block copolymer A2 is a polymer block configured such that an aromatic vinyl monomer unit obtained by polymerization of an aromatic vinyl monomer becomes a main repeating unit.

There are no particular limitations on the aromatic vinyl monomer used to form the aromatic vinyl polymer block if it is an aromatic vinyl compound. Examples thereof may include styrene; styrenes having an alkyl group as a substituent such as α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, and 5-t-butyl-2-methylstyrene; styrenes having an ether group or an ester group as a substituent such as 4-acetoxystyrene, 4-(1-ethoxyethoxy) styrene, 4-methoxystyrene, 4-ethoxystyrene, and 4-t-butoxystyrene; styrenes having a halogen atom as a substituent such as 2-chlorostyrene, 3-chlorostyrene, 4-chlorostyrene, 4-bromostyrene, and 2,4-dibromostyrene; styrenes having an alkyl group and a halogen atom as a substituent such as 2-methyl-4,6-dichlorostyrene; and vinyl naphthalene. These aromatic vinyl monomers may be used in one kind alone, or two kinds or more thereof may be used in combination.

Among these, from the perspective of the ease in availability, styrene, styrenes having C1 to C12 alkyl group as a substituent, and styrenes having an ether group or an ester group as a substituent are preferable, and the usage of styrene is particularly preferable. It means that the aromatic vinyl polymer block is preferably polystyrene.

The aromatic vinyl polymer block ($Ar^a$ and $Ar^b$) in the block copolymer A1 and the block copolymer A2 may respectively include a monomer unit other than the aromatic vinyl monomer unit as long as the aromatic vinyl monomer unit becomes a main repeating unit. Examples of the monomer that constitutes the monomer unit other than the aromatic vinyl monomer unit that can be included in the aromatic vinyl polymer block may include, conjugated diene monomers such as 1,3-butadiene and isoprene(2-methyl-1,3-butadiene); α,β-unsaturated nitrile monomers such as acrylonitrile and methacrylonitrile; unsaturated carboxylic acid anhydride monomers such as maleic anhydride, butenyl succinic anhydride, tetrahydro phthalic anhydride, and citraconic anhydride; unsaturated carboxylic acid ester monomers such as methyl acrylate, ethyl acrylate, 2-ethylhexyl acrylate, methyl methacrylate, ethyl methacrylate, and 2-ethylhexyl methacrylate; and non-conjugated diene monomers preferably with 5 to 12 carbon atoms such as 1,4-pentadiene and 1,4-hexadiene.

The content of the monomer unit other than the aromatic vinyl monomer unit in each of the aromatic vinyl polymer block is preferably 20 mass % or less, more preferably 10 mass % or less, and particularly preferably substantially 0 mass %.

The conjugated diene polymer block ($D^a$ and $D^b$) in the block copolymer A1 and the block copolymer A2 is a polymer block configured such that a conjugated diene monomer unit obtained by polymerization of a conjugated diene monomer becomes a main repeating unit.

There are no particular limitations on the conjugated diene monomer used to form the conjugated diene polymer block if it is a conjugated diene compound. For example, 1,3-butadiene, isoprene, 2,3-dimethyl-1,3-butadiene, 2-chloro-1,3-butadiene, 1,3-pentadiene, and 1,3-hexadiene may be exemplified. These conjugated diene monomers may be used in one kind alone, or two kinds or more thereof may be used in combination.

Among these, it is preferable to use 1,3-butadiene and/or isoprene, and it is particularly preferable to use isoprene. It means that the conjugated diene polymer block is preferably polybutadiene and/or polyisoprene, is more preferably polyisoprene. When the conjugated diene polymer block is configured by an isoprene unit, the block copolymer composition may be excellent in flexibility and stress relaxation, and may have smaller tension set.

These conjugated diene monomers may be used in one kind alone, or two kinds or more thereof may be used in combination, in each of the conjugated diene polymer block. Also, in each of the conjugated diene polymer block, the same conjugated diene monomer may be used, and different conjugated diene monomers may be used.

The conjugated diene polymer block ($D^a$ and $D^b$) in the block copolymer A1 and the block copolymer A2 may respectively include a monomer unit other than the conjugated diene monomer unit as long as the conjugated diene monomer unit becomes a main repeating unit. Examples of the monomer that constitutes the monomer unit other than the conjugated diene monomer unit that can be included in the conjugated diene polymer block may include, aromatic vinyl monomers such as styrene and α-methylstyrene; α,β-unsaturated nitrile monomers; unsaturated carboxylic acid anhydride monomers; unsaturated carboxylic acid ester monomers; and non-conjugated diene monomers. Incidentally, detailed examples of each monomer may be the same as the monomers that constitute the above described monomer unit other than the aromatic vinyl monomer unit that can be included in the aromatic vinyl polymer block.

The content of the monomer unit other than the conjugated diene monomer unit in each of the conjugated diene polymer block is preferably 20 mass % or less, more preferably 10 mass % or less, and particularly preferably substantially 0 mass %.

As shown in the formula I, the block copolymer A1 is a multi-block copolymer configured such that two or more of a diblock ($Ar^a$-$D^a$) formed by the bond of an aromatic vinyl polymer block ($Ar^a$) having a specific weight average molecular weight with a conjugated diene polymer block ($D^a$) having a specific vinyl content and weight average molecular weight are bonded directly in a single bond or via the residue of a coupling agent so as the aromatic vinyl polymer block ($Ar^a$) side comes to the end.

As the coupling agent, an alkoxysilane compound including two or more of an alkoxy group directly bonded with a silicon atom per a molecule may be used. Specific examples of the alkoxysilane compound may include a dialkyldialkoxysilane compound such as dimethyldimethoxysilane, dimethyldiethoxysilane, dimethyldipropoxysilane, dimethyldibutoxysilane, dimethyldiphenoxysilane, diethyldimethoxysilane, diethyldiethoxysilane, diethyldipropoxysilane, diethyldibutoxysilane, and diethyldiphenoxysilane; a monoalkyltrialkoxysilane compound such as methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, and ethyltriphenoxysilane; a tetraalkoxysilane compound such as tetramethoxysilane, tetraethoxysilane, tetrapropoxysilane, tetrabutoxysilane, tetraphenoxysilane, and tetratoluiloxysilane; an alkenylalkoxysilane compound such as vinyltrimethoxysilane, vinyltriethoxysilane, vinyltripropoxysilane, vinyltributoxysilane, vinyltriphenoxysilane, allyltrimethoxysilane, octenyltrimethoxysilane, divinyldimethoxysilane, and styryltrimethoxysilane; an arylalkoxysilane compound such as phenyltrimethoxysilane, phenyltriethoxysilane, phenyltripropoxysilane, phenyltributoxysilane, and phenyltriphenoxysilane; a halogenoalkoxysilane compound such as trimethoxychlorosilane, triethoxychlorosilane, tripropoxychlorosilane, tributoxychlorosilane, triphenoxychlorosilane, dimethoxydichlorosilane, dipropoxydichlorosilane, diphenoxydichlorosilane, methoxytrichlorosilane, ethoxytrichlorosilane, propoxytrichlorosilane, phenoxytrichlorosilane, trimethoxybromosilane, triethoxybromosilane, tripropoxybromosilane, triphenoxybromosilane, dimethoxydibromosilane, diethoxydibromosilane, diphenoxydibromosilane, methoxytribromosilane, ethoxytribromosilane, propoxytribromosilane, phenoxytribromosilane, trimethoxyiodosilane, triethoxyiodosilane, tripropoxyiodosilane, triphenoxyiodosilane, dimethoxydiiodosilane, diethoxydiiodosilane, dipropoxydiiodosilane, methoxytriiodosilane, ethoxytriiodosilane, propoxytriiodosilane, and phenoxytriiodosilane; a halogenoalkylalkoxysilane compound such as β-chloroethylmethyldimethoxysilane and γ-chloropropylmethyldimethoxysilane; and hexamethoxydisilane, hexaethoxydisilane, bis(trimethoxysilyl)methane, bis(triethoxysilyl)methane, bis(trimethoxysilyl)ethane, bis(triethoxysilyl)ethane, bis(trimethoxysilyl)propane, bis(triethoxysilyl)propane, bis(trimethoxysilyl)butane, bis(triethoxysilyl)butane, bis(trimethoxysilyl)heptane, bis(triethoxysilyl)heptane, bis(trimethoxysilyl)hexane, bis(triethoxysilyl)hexane, bis(trimethoxysilyl)benzene, bis(triethoxysilyl)benzene, bis(trimethoxysilyl)benzene, bis(trimethoxysilyl)cyclohexane, bis(triethoxysilyl)cyclohexane, bis(triethoxysilyl)benzene, and bis(3-triethoxysilylpropyl)ethane. Among these, an alkoxysilane compound of which functional group reacting with the active terminal of the polymer is just the alkoxy group is preferably used. In specific, a dialkylalkoxysilane compound, a monoalkyltrialkoxysilane compound, or a tetraalkoxysilane compound is more preferably used, and the tetraalkoxysilane compound is particularly preferably used. Such an alkoxysilane compound is used as the coupling agent and thus both high elasticity and small tension set may be achieved in high levels. These coupling agents may be used in one kind alone, or two kinds or more thereof may be used in combination.

The number of the bond of the diblock ($Ar^a$-$D^a$) (that is "n" in the formula I) is not particularly limited if it is 2 or more; the block copolymer A1 in which different number of the diblocks are bonded may coexist. The "n" in the formula I is not particularly limited if it is an integer of 2 or more; however, it is usually an integer of 2 to 8, and preferably an integer of 2 to 4.

The weight average molecular weight (Mw($Ar^a$)) of two or more of the aromatic vinyl polymer block ($Ar^a$) included per a molecule in the block copolymer A1 is 3,000 to 25,000, preferably 5,000 to 22,000, and more preferably 7,000 to 20,000. If Mw($Ar^a$) is out of this range, there is a risk that the tension set of the block copolymer composition to be obtained may be too large.

The weight average molecular weight (Mw($Ar^a$)) of the two or more of the aromatic vinyl polymer block ($Ar^a$) included per a molecule in the block copolymer A1 may be equal and may be different from each other if it is in the above range, but is preferably substantially equal. Also, as described later, when the block copolymer A further includes the block copolymer A3 that is an asymmetric aromatic vinyl-conjugated diene-aromatic vinyl triblock copolymer in which two aromatic vinyl polymer blocks respectively have different specific weight average molecular weight, the weight average molecular weight (Mw($Ar^a$)) of these aromatic vinyl polymer blocks is, preferably substantially equal to the weight average molecular weight (Mw($Ar1^c$)) of the aromatic vinyl polymer block ($Ar1^c$) having comparatively small weight average molecular weight in the block copolymer A3.

The vinyl bond content of the conjugated diene polymer block ($D^a$) in the block copolymer A1 (the proportion occupied by 1,2-vinyl bond and 3,4-vinyl bond among all the conjugated diene monomer units in the conjugated diene polymer block) is 0.1 mol % to 50 mol %, preferably 1 mol % to 30 mol %, and more preferably 3 mol % to 10 mol %. If this vinyl bond content is too high, there is a risk that the tension set of the block copolymer composition to be obtained may be too large.

Also, when the block copolymer A further includes the later described block copolymer A3, the vinyl bond content of the conjugated diene polymer block ($D^a$) in the block copolymer A1 is preferably substantially equal to the vinyl bond content of the conjugated diene polymer block ($D^c$) in the block copolymer A3.

Incidentally, the vinyl bond content of the conjugated diene polymer block in the present specification may be measured using $^1$H-NMR.

The weight average molecular weight (Mw($D^a$)) of the conjugated diene polymer block ($D^a$) in the block copolymer A1 is 5,000 to 250,000, preferably 10,000 to 200,000, and more preferably 15,000 to 150,000. When the weight average molecular weight (Mw($D^a$)) of the conjugated diene polymer block ($D^a$) is in this range, the block copolymer composition may be excellent in elasticity and stress relaxation, and may have small tension set.

Incidentally, in the formula I, when X is a single bond and the block copolymer A1 is a multi-block copolymer configured such that two diblocks ($Ar^a$-$D^a$) are directly bonded in the single bond so as the aromatic vinyl polymer block ($Ar^a$) side comes to the end, the conjugated diene polymer block included therein is the one in which all the monomer units are directly bonded with; in reality, it is not formed of two of the conjugated diene polymer block ($D^a$). However, in the present invention conceptually addresses even such a conjugated diene polymer block as the one in which two of the conjugated diene polymer block ($D^a$) having substantially equal weight average molecular weight are bonded to each other in a single bond. For example, in the formula I, when X is a single bond, n is 2, and the block copolymer A1 is an aromatic vinyl-conjugated diene-aromatic vinyl triblock copolymer represented by $(Ar^a\text{-}D^a)\text{-}(D^a\text{-}Ar^a)$, it is conceptually addressed as the one in which two conjugated diene polymer blocks ($D^a$) having substantially equal weight average molecular weight are bonded in a single bond. Accordingly, for example, in the block copolymer A1 as described above, when the conjugated diene polymer block has the weight average molecular weight of 100,000 as a whole, $Mw(D^a)$ thereof is addressed as 50,000.

There are no particular limitations on the content of the aromatic vinyl monomer unit among all the monomer units in the block copolymer A1, but it is usually 5 to 50 mass %, preferably 7 to 45 mass %, and more preferably 10 to 40 mass %. When the content of the aromatic vinyl monomer unit in the block copolymer A1 is in the above range, the block copolymer composition may be excellent in elasticity and stress relaxation, and may have small tension set.

Incidentally, the content of the aromatic vinyl monomer unit in the block copolymer in the present specification may be measured using $^1$H-NMR.

Also, there are no particular limitations on the weight average molecular weight of the block copolymer A1 as a whole, but it is usually 40,000 to 800,000, preferably 60,000 to 600,000, and more preferably 80,000 to 400,000.

Incidentally, the weight average molecular weight (Mw) and the number average molecular weight (Mn) of the block copolymer in the present specification are meant to be determined as a value measured by high performance liquid chromatography using tetrahydrofuran (THF) as a solvent, and calculated relative to polystyrene standards.

As shown in the formula II, the block copolymer A2 is an aromatic vinyl-conjugated diene diblock copolymer formed by the bond of an aromatic vinyl polymer block ($Ar^b$) having a specific weight average molecular weight with a conjugated polymer block ($D^b$) having a specific vinyl bond content and a specific weight average molecular weight.

The weight average molecular weight ($Mw(Ar^b)$) of the aromatic vinyl polymer block ($Ar^b$) in the block copolymer A2 is 3,000 to 25,000, preferably 5,000 to 22,000, and more preferably 7,000 to 20,000. If $Mw(Ar^b)$ is out of this range, there is a risk that the tension set of the block copolymer composition to be obtained may be too large.

Also, when the block copolymer A further includes the later described block copolymer A3, the weight average molecular weight ($Mw(Ar^b)$) of the aromatic vinyl polymer block in the block copolymer A2 is preferably substantially equal to the weight average molecular weight ($Mw(Ar1^c)$) of the aromatic vinyl polymer block ($Ar1^c$) having comparatively small weight average molecular weight in the block copolymer A3.

The vinyl bond content of the conjugated diene polymer block ($D^b$) in the block copolymer A2 is 0.1 mol % to 50 mol %, preferably 1 mol % to 30 mol %, and more preferably 3 mol % to 10 mol %. If this vinyl bond content is too high, there is a risk that the tension set of the block copolymer composition to be obtained may be large.

Also, when the block copolymer A further includes the later described block copolymer A3, the vinyl bond content of the conjugated diene polymer block ($D^b$) in the block copolymer A2 is preferably substantially equal to the vinyl bond content of the conjugated diene polymer block ($D^c$) in the block copolymer A3.

The weight average molecular weight ($Mw(D^b)$) of the conjugated diene polymer block ($D^b$) in the block copolymer A2 is 5,000 to 500,000, preferably 10,000 to 400,000, and more preferably 15,000 to 300,000. When the weight average molecular weight ($Mw(D^b)$) of the conjugated diene polymer block ($D^b$) is in this range, the block copolymer composition may be excellent in elasticity and stress relaxation, and may have small tension set.

Also, when the block copolymer A further includes the later described block copolymer A3, the weight average molecular weight ($Mw(D^b)$) of the conjugated diene polymer block ($D^b$) in the block copolymer A2 is preferably substantially equal to the weight average molecular weight ($Mw(D^c)$) of the conjugated diene polymer block ($D^c$) in the block copolymer A3.

The content of the aromatic vinyl monomer unit among all the monomer units in the block copolymer A2 is not particularly limited but is usually 5 to 50 mass %, preferably 7 to 45 mass %, and more preferably 10 to 40 mass %.

Also, the weight average molecular weight of the block copolymer A2 as a whole is not particularly limited, but usually 40,000 to 400,000, preferably 50,000 to 350,000, and more preferably 60,000 to 300,000.

The molecular weight distribution represented by the ratio (Mw/Mn) of the weight average molecular weight (Mw) and the number average molecular weight (Mn) of the block copolymer A1 and the block copolymer A2, as well as each polymer block configuring these are not particularly limited, but usually respectively 1.8 or less, preferably 1.3 or less, and more preferably 1.1 or less. When these molecular weight distributions are in the above described range, the block copolymer composition to be obtained may have both high elasticity and stress relaxation with a high level of compatibility.

The mass ratio (A1/A2) of the block copolymer A1 and the block copolymer A2 is 100/0 to 50/50, preferably 100/0 to 80/20, and more preferably 100/0 to 90/10. When each of the block copolymer are included in such a ratio, the block copolymer composition may easily have both high elasticity and small tension set. If this ratio is too small, the elasticity of the block copolymer composition tends to be insufficient, and if this ratio is too large, the tension set of the block copolymer composition tends to be large.

The block copolymer A may further include the block copolymer A3 represented by the below formula III:

$Ar1^c\text{-}D^c\text{-}Ar2^c$     (III).

The block copolymer A3 is an aromatic vinyl-conjugated diene-aromatic vinyl triblock copolymer including two aromatic vinyl polymer blocks having different weight average molecular weight from each other.

The aromatic vinyl polymer block ($Ar1^c$ and $Ar2^c$) in the block copolymer A3 is a polymer block configured such that an aromatic vinyl monomer unit obtained by the polymerization of an aromatic vinyl monomer becomes a main repeating unit.

The aromatic vinyl monomer used to form the aromatic vinyl polymer block may be the same as those described for the block copolymer A1 and the block copolymer A2 above.

The aromatic vinyl polymer block ($Ar1^c$ and $Ar2^c$) may include a monomer unit other than the aromatic vinyl monomer unit as long as the aromatic vinyl monomer unit becomes the main repeating unit. The monomer constituting the monomer unit other than the aromatic vinyl monomer unit that can be included in the aromatic vinyl polymer block may be the same as those described for the block copolymer A1 and the block copolymer A2 above. Also, the content of the monomer unit other than the aromatic vinyl monomer unit in the aromatic vinyl polymer block may be the same as those described for the block copolymer A1 and the block copolymer A2 above.

The conjugated diene polymer block ($D^c$) in the block copolymer A3 is a polymer block configured such that a conjugated diene monomer unit obtained by the polymerization of a conjugated diene monomer becomes a main repeating unit.

The conjugated diene monomer used to form the conjugated diene polymer block may be the same as those described for the block copolymer A1 and the block copolymer A2 above.

The conjugated diene polymer block ($D^c$) may include a monomer unit other than the conjugated diene monomer unit as long as the conjugated diene monomer unit becomes the main repeating unit. The monomer constituting the monomer unit other than the conjugated diene monomer unit that can be included in the conjugated diene polymer block may be the same as those described for the block copolymer A1 and the block copolymer A2 above. Also, the content of the monomer unit other than the conjugated diene monomer unit in the conjugated diene polymer block may be the same as those described for the block copolymer A1 and the block copolymer A2 above.

In the formula III, $Ar1^c$ is an aromatic vinyl polymer block of which weight average molecular weight is 3,000 to 25,000, $Ar2^c$ is an aromatic vinyl polymer block of which weight average molecular weight is 30,000 to 300,000, and $D^c$ is a conjugated diene polymer block of which vinyl bond content is 0.1 mol % to 50 mol % and weight average molecular weight is 10,000 to 500,000.

As shown in the formula III, the block copolymer A3 is an asymmetric aromatic vinyl-conjugated diene-aromatic vinyl triblock copolymer configured such that an aromatic vinyl polymer block ($Ar1^c$) having comparatively small weight average molecular weight, a conjugated diene polymer block ($D^c$) having a specific vinyl bond content and a specific weight average molecular weight, and an aromatic vinyl polymer block ($Ar2^c$) having comparatively large weight average molecular weight are connected in this order.

The weight average molecular weight (Mw($Ar1^c$)) of the aromatic vinyl polymer block ($Ar1^c$) having comparatively small weight average molecular weight is 3,000 to 25,000, preferably 5,000 to 22,000, and more preferably 7,000 to 20,000. If Mw($Ar1^c$) is out of this range, there is a risk that the tension set of the block copolymer composition to be obtained may be insufficient.

Also, the weight average molecular weight (Mw($Ar2^c$)) of the aromatic vinyl polymer block ($Ar2^c$) having comparatively large weight average molecular weight is 30,000 to 300,000, preferably 32,000 to 250,000, and more preferably 35,000 to 200,000. If Mw($Ar2^c$) is too small, there is a risk that the tension set of the block copolymer composition to be obtained may be insufficient, and the block copolymer A3 having too large Mw($Ar2^c$) may be difficult to manufacture in some cases.

In the block copolymer A3, the ratio (Mw($Ar2^c$)/Mw($Ar1^c$)) of the weight average molecular weight (Mw($Ar2^c$)) of the aromatic vinyl polymer block ($Ar2^c$) having comparatively large weight average molecular weight and the weight average molecular weight (Mw($Ar1^c$)) of the aromatic vinyl polymer block ($Ar1^c$) having comparatively small weight average molecular weight is not particularly limited, but usually 1.2 to 67, preferably 2 to 40, and more preferably 2.5 to 35. When the block copolymer A3 is configured in this manner, the block copolymer composition having smaller tension set and higher elasticity, as well as rich elasticity may be obtained.

The vinyl bond content of the conjugated diene polymer block ($D^c$) in the block copolymer A3 is 0.1 mol % to 50 mol %, preferably 1 mol % to 30 mol %, and more preferably 3 mol % to 10 mol %. If this vinyl bond content is too high, there is a risk that the tension set of the block copolymer composition to be obtained may be large.

The weight average molecular weight (Mw($D^c$)) of the conjugated diene polymer block ($D^c$) in the block copolymer A3 is 10,000 to 500,000, preferably 20,000 to 400,000, and more preferably 30,000 to 300,000. When the weight average molecular weight of the conjugated diene polymer block is in the above range, the block copolymer composition may be excellent in elasticity and stress relaxation, and may have small tension set.

There are no particular limitations on the content of the aromatic vinyl monomer unit among all the monomer units in the block copolymer A3, but it is usually 30 to 90 mass %, preferably 40 to 87 mass %, and more preferably 50 to 85 mass %. When the content of the aromatic vinyl monomer unit in the block copolymer A3 is in the above range, the block copolymer composition may be excellent in elasticity and stress relaxation, and may have small tension set.

Also, there are no particular limitations on the weight average molecular weight of the block copolymer A3 as a whole, but it is usually 50,000 to 800,000, preferably 70,000 to 600,000, and more preferably 90,000 to 750,000.

The molecular weight distribution represented by the ratio (Mw/Mn) of the weight average molecular weight (Mw) and the number average molecular weight (Mn) of the block copolymer A3 and each polymer block configuring thereof are not particularly limited, but it is respectively usually 1.8 or less, preferably 1.3 or less, and more preferably 1.1 or less. When these molecular weight distributions of the block copolymer are in the above described range, the block copolymer composition to be obtained may have both high elasticity and stress relaxation with a high level of compatibility.

The mass ratio [(A1+A3)/A2] of the block copolymer A1, the block copolymer A2, and the block copolymer A3 is 100/0 to 50/50, preferably 100/0 to 80/20, and more preferably 100/0 to 90/10. When each block copolymer is included in such a ratio, the block copolymer composition may easily have both high elasticity and small tension set. If this ratio is too small, the elasticity of the block copolymer composition tends to be insufficient, and if this ratio is too large, the tension set of the block copolymer composition tends to be large.

Also, there are no particular limitations of the mass ratio of the block copolymer A1 and the block copolymer A3; it may be appropriately selected in accordance with factors such as the balance between elasticity and tension set.

There are no particular limitations on the melt index of the block copolymer A, but as a value measured based on ASTM D-1238 (G condition, 200° C., 5 kg), it is usually 1 to 1000 g/10 minutes, preferably 3 to 700 g/10 minutes, and more preferably 5 to 500 g/10 minutes. In this range, the moldability of the block copolymer composition to be obtained may be particularly well.

There are no particular limitations on the method for obtaining the block copolymer A, and it may be produced according to a usual method. Incidentally, the method for producing the block copolymer A is described later.

(2) Functional Group Capable of Forming Non-Covalent Bond

Examples of the non-covalent bond may include a hydrogen bond, a coordination bond, and an ionic bond. Above all, the functional group capable of forming a non-covalent bond is preferably a functional group capable of forming a hydrogen bond. The reason therefor is that in the hydrogen bond, the binding force per one bond is reasonable (i.e., the binding force is weak, or relaxation time is short), and thus rearrangement thereof is possible.

Examples of the functional group capable of forming a non-covalent bond may include an amide group, an imide group, a urethane bond, a carboxyl group or its salt, and a hydroxyl group or its salt.

Also, the functional group capable of forming a hydrogen bond is preferably at least one kind selected from the group consisting of an amide group, an imide group, a urethane bond, a carboxyl group, and a hydroxyl group.

The block copolymer B includes the functional group capable of forming a non-covalent bond, and the functional group capable of forming a non-covalent bond may be, for example, directly bonded with the block copolymer, and may be bonded via a linking group.

The block copolymer B is formed by introducing a functional group capable of forming a non-covalent bond into the block copolymer A. The method for introducing the functional group capable of forming a non-covalent bond may be a method that allows the introduction of the functional group capable of forming a non-covalent bond into the block copolymer A, and examples thereof may include a modification method with a modifier and a method using the functional group conversion reaction of alkene. Among them, the modification method with a modifier is preferable. In other words, it is preferable that the functional group capable of forming a non-covalent bond includes the residue of a modifier.

Also, when the modification method with a modifier is used, the functional group capable of forming a non-covalent bond may be introduced by the modification with the modifier, and the functional group capable of forming a non-covalent bond may be introduced by a further reaction after the modification with the modifier.

Incidentally, "the residue of modifier" signifies the portion derived from the modifier in the reaction product generated when the modifier reacts with the block copolymer A, or in the reaction product generated when the modifier reacts with the block copolymer A and further reacts with an additional compound.

Examples of the modifier may include an acid modifier. Also, examples of the acid modifier may include an unsaturated carboxylic acid and an unsaturated dicarboxylic acid anhydride. Among them, from the aspects such as the ease of reaction and economical efficiency, the unsaturated dicarboxylic acid anhydride is preferable. Incidentally, the unsaturated carboxylic acid and the unsaturated dicarboxylic acid anhydride are described later.

If the acid modifier is the unsaturated carboxylic acid, a carboxyl group derived from the unsaturated carboxylic acid will be introduced to the block copolymer A. Incidentally, the carboxyl group is a group capable of forming a non-covalent bond, and the carboxyl group may be substituted with a different functional group capable of forming a non-covalent bond if it is brought into further reaction after the modification with the acid modifier.

Also, if the acid modifier is the unsaturated dicarboxylic acid anhydride, an acid anhydride group derived from the unsaturated dicarboxylic acid anhydride will be introduced to the block copolymer A. Incidentally, when the acid modifier is the unsaturated dicarboxylic acid anhydride, the acid anhydride group may be substituted with a functional group capable of forming a non-covalent bond if it is brought into further reaction after the modification with the acid modifier. In specific, the acid anhydride group may be substituted with the functional group capable of forming a non-covalent bond when the acid anhydride group is brought into reaction with a base in a base treatment, or when the acid anhydride group is hydrolyzed with a base.

Above all, the method for introducing the functional group capable of forming a non-covalent bond is preferably the method of introducing the functional group capable of forming a non-covalent bond by a further base treatment after the modification with the acid modifier. In other words, the block copolymer B is preferably the one the block copolymer A acid-modified to be a modified block copolymer C further undergoes the base treatment. That is to say, the functional group capable of forming a non-covalent bond is preferably a group formed by a reaction of a carboxyl group or an acid anhydride group introduced to the block copolymer A with a base; or a group formed by hydrolyzing an acid anhydride group introduced to the block copolymer A with a base. In particular, the functional group capable of forming a non-covalent bond is preferably a group formed by a reaction of an acid anhydride group introduced to the block copolymer A with a base. Incidentally, such a method for introducing the functional group capable of forming a non-covalent bond is described later.

Also, when the functional group capable of forming a non-covalent bond is a group formed by a reaction of a carboxyl group or an acid anhydride group introduced to the block copolymer A with a base, at least a part of the carboxyl group or the acid anhydride group introduced to the block copolymer A is to react with the base; a part of the carboxyl group or the acid anhydride group may react with the base, or the whole of the carboxyl group or the acid anhydride group may react with the base. In other words, the block copolymer B may include both of the group formed by the reaction of the carboxyl group or the acid anhydride group introduced to the block copolymer A with the base, and the carboxyl group or the acid anhydride group introduced to the block copolymer A.

Also, when the functional group capable of forming a non-covalent bond is a group formed by hydrolyzing the acid anhydride group introduced to the block copolymer A with the base, at least a part of the acid anhydride group introduced to the block copolymer A is to be hydrolyzed; a part of the acid anhydride group may be hydrolyzed, and the whole of the acid anhydride group may be hydrolyzed. In other words, the block copolymer B may include both of the group formed by hydrolyzing the acid anhydride group introduced to the block copolymer A with a base, and the acid anhydride group introduced to the block copolymer A.

Specific examples of the group formed by the reaction of the carboxyl group or the acid anhydride group with a base may include an amide group and the metal salt of a carboxyl group. Also, specific examples of the group formed by hydrolyzing the acid anhydride group with a base may include a carboxyl group.

In this manner, the functional group capable of forming a non-covalent bond preferably includes the residue of the acid modifier, specifically, preferably includes the residue of the unsaturated carboxylic acid or the unsaturated dicarboxylic acid anhydride, and more preferably includes the residue of the unsaturated dicarboxylic acid anhydride.

Examples of the unsaturated dicarboxylic acid may include a C8 or less ethyleny unsaturated carboxylic acid such as an acrylic acid, a methacrylic acid, a crotonic acid, a maleic acid, a fumaric acid, an itaconic acid, and a citraconic acid; and a Diels-Alder addition product of a conjugated diene such as 3,6-endomethylene-1,2,3,6-tetrahydrophthalic acid and a C8 or less α,β-unsaturated carboxylic acid.

Examples of the unsaturated dicarboxylic acid anhydride may include a C8 or less α,β-unsaturated dicarboxylic acid anhydride such as a maleic anhydride, an itaconic anhydride, and a citraconic anhydride; and a Diels-Alder addition product of a conjugated diene such as 3,6-endomethylene-1,2,3,6-tetrahydrophthalic anhydride and a C8 or less α,β-unsaturated dicarboxylic acid anhydride.

From the aspects such as the ease of reaction and economical efficiency, the unsaturated dicarboxylic acid anhydride is preferable, the C8 or less α,β-unsaturated dicarboxylic acid anhydride is more preferable, and the maleic anhydride is particularly preferable.

The functional group capable of forming a non-covalent bond may include the residue of one kind or two kinds or more of the unsaturated dicarboxylic acid or the unsaturated dicarboxylic acid anhydride.

Also, the base may be the one that may react with the carboxyl group or the acid anhydride group to form the functional group capable of forming a non-covalent bond, or the one that may hydrolyze the acid anhydride group, and examples thereof may include at least one kind selected from the group consisting of an alkali metal-containing compound, an alkali earth metal-containing compound, ammonia, and an amine compound. Examples of the alkali metal-containing compound may include the oxide, hydroxide, carbonate, hydrogen carbonate, acetate, sulfate and phosphate of an alkali metal such as sodium, lithium, and potassium. Examples of the alkali earth metal-containing compound may include the oxide, hydroxide, carbonate, hydrogen carbonate, acetate, sulfate, and phosphate of an alkali earth metal such as magnesium and calcium. The amine compound may be any one of a primary amine compound, a secondary amine compound, and a tertiary amine compound. Also, the amine compound may be monoamine and may be diamine, but monoamine is preferably used since it is easily available. Examples of the amine compound may include an aliphatic amine, an aromatic amine, an alicyclic amine, and a heterocyclic amine. Among them, the aliphatic amine is preferable, particularly, a C1-12 alkyl amine is preferable, and a C2, 4, or 6 alkyl amine is more preferable.

Above all, it is preferable that the base is one kind selected from the group consisting of ammonia, the primary amine compound, and the secondary amine compound. The reason therefor is that they are capable of reacting with the carboxyl group or the acid anhydride group to generate an amide group.

In particular, it is preferable that the functional group capable of forming a non-covalent bond is a group formed by the reaction of the acid anhydride group introduced to the block copolymer A with the amine compound. The reason therefor is that the reaction of the acid anhydride group with the amine compound may generate a carboxyl group and an amide group.

The introduction rate of functional group capable of forming a non-covalent bond to the block copolymer B may be to the extent that allows the effect of the present invention to be obtained; for example, per 100 mol % of the conjugated diene monomer unit in the block copolymer B, the rate is preferably 2.5 mol % to 25 mol %, and more preferably 5 mol % to 20 mol %. If the introduction rate of the functional group capable of forming a non-covalent bond is too high, many non-covalent bonds (non-covalent crosslinking points) would be formed and stress would be concentrated at the physical crosslinking points before the rearrangement of the functional group capable of forming a non-covalent bond, which easily causes a fracture.

Incidentally, the introduction rate of the functional group capable of forming a non-covalent bond may be calculated using $^1$H-NMR. Also, whether the functional group capable of forming a non-covalent bond is introduced or not can be confirmed by the $^1$H-NMR and/or an infrared spectroscopic analysis.

2. Other Polymers

The block copolymer composition of the present invention may be the one that includes just the block copolymer B as a polymer component, but it may include an additional polymer component thereto.

The block copolymer composition of the present invention may include, for example, the block copolymer A, in addition to the block copolymer B. It means that the block copolymer composition of the present invention may include at least one of block copolymer A1, block copolymer A2, and block copolymer A3, those not including the functional group capable of forming a non-covalent bond.

Also, examples of the polymer component other than the block copolymer B that can be included in the block copolymer composition of the present invention in addition to the block copolymer A may include an aromatic vinyl-conjugated diene-aromatic vinyl block copolymer other than the block copolymer A and the block copolymer B, an aromatic vinyl-conjugated diene block copolymer, an aromatic vinyl homopolymer, a conjugated diene homopolymer, an aromatic vinyl-conjugated diene random copolymer, and the branch-type polymer of these; a thermoplastic elastomer such as a polyurethane-based thermoplastic elastomer, a polyamide-based thermoplastic elastomer, and a polyester-based thermoplastic elastomer; and a thermoplastic resin such as polyethylene, polypropylene, polyvinyl chloride, an acrylonitrile-styrene copolymer, an acrylonitrile-butadiene-styrene copolymer, and polyphenylene ether.

However, an aromatic vinyl polymer and a polyolefin-based thermoplastic resin described in the section "B. Film" later are distinguished from the polymer components configured in this block copolymer composition.

The content of these additional polymers in the block copolymer composition is preferably 20 mass % or less and more preferably 10 mass % or less among all the polymer components.

3. Method for Producing Block Copolymer Composition

As the method for producing the block copolymer composition of the present invention, a method comprising steps of: a first step of obtaining a modified block copolymer C to which a carboxyl group or an acid anhydride group is introduced via a reaction of a block copolymer A with an unsaturated carboxylic acid or an unsaturated dicarboxylic acid anhydride; and a second step of conducting a base treatment to the modified block copolymer C to obtain a block copolymer B to which a functional group capable of forming a non-covalent bond is introduced, is suitable.

(1) Block Copolymer A

The block copolymer A used in the first step is the same as that described above.

There are no particular limitations on the method for obtaining the block copolymer A, and the method may be appropriately selected in accordance with the composition of the block copolymer A. For example, when the block copolymer A includes block copolymer A1, block copolymer A2, and block copolymer A3, the block copolymer A1, the block copolymer A2, and the block copolymer A3 may respectively be separately produced in accordance with a conventional production method of block copolymers, an additional component such as an additional polymer component is blended thereto as required, and then these are mixed in accordance with a usual method such as kneading and solution mixing. Thereby, the block copolymer A may be produced. Above all, when the block copolymer A is a mixture including the block copolymer A1, the block copolymer A2, and the block copolymer A3, or is a mixture including the block copolymer A1 and the block copolymer A3, from the aspect of obtaining the block copolymer A with better production efficiency, a production method described as follows is suitable.

That is, when the block copolymer A is a mixture including the block copolymer A1, the block copolymer A2, and the block copolymer A3, or is a mixture including the block copolymer A1 and the block copolymer A3, it is preferable that the block copolymer A is produced by using one out of below four embodiments of the method for producing the block copolymer A. Regarding the details of reactions, publications such as WO2009/123089, JP-A No. 2012-77158, and WO2015/099163 may be used as references.

First Embodiment

The first embodiment of the method for producing the block copolymer A is a method for producing the block copolymer A that is a mixture including the block copolymer A1, the block copolymer A2, and the block copolymer A3, the method comprising below steps 1a to 6a:

1a: a step of polymerizing an aromatic vinyl monomer using a polymerization initiator in a solvent;
2a: a step of adding a conjugated diene monomer to a solution containing an aromatic vinyl polymer that includes an active terminal obtained in the step 1a above;
3a: a step of forming the block copolymer A1 by adding a coupling agent to the solution containing an aromatic vinyl-conjugated diene block copolymer that includes the active terminal obtained in the step 2a above so that a functional group to the active terminal is in the amount of less than equivalent to 1 mol;
4a: a step of forming the block copolymer A2 by adding a polymerization terminator to the solution containing the block copolymer A1 and the aromatic vinyl-conjugated diene block copolymer that includes the active terminal, obtained in the step 3a above, in an amount of less than equivalent to 1 mol to the active terminal;
5a: a step of forming the block copolymer A3 by adding an aromatic vinyl monomer to the solution containing the block copolymer A1, the block copolymer A2, and the aromatic vinyl-conjugated diene block copolymer that includes the active terminal, obtained in the step 4a above; and
6a: a step of collecting the block copolymer A from the solution obtained in the step 5a above.

Step 1a

First, an aromatic vinyl monomer is polymerized using a polymerization initiator in a solvent.

As the polymerization initiator to be used, an organic alkali metal compound, an organic alkali earth metal compound, and an organic lanthanoid-series rare earth metal compound, those generally known as the one having an anion polymerization activity to an aromatic vinyl monomer and a conjugated diene monomer, may be used.

There are no particular limitations on the solvent to be used for the polymerization if it is inactive to the polymerization initiator; for example, a chain hydrocarbon solvent, a cyclic hydrocarbon solvent, or a mixture solvent of these may be used.

On the occasion of obtaining the block copolymer A, a Lewis base compound may be added to the reactor used for the polymerization in order to control the structure of each polymer block in each block copolymer.

A temperature for polymerization reaction is usually 10 to 150° C., preferably 30 to 130° C., and more preferably 40 to 90° C. The time required for the polymerization varies with the conditions, but it is usually within 48 hours, and preferably 0.5 to 10 hours. There are no particular limitations on polymerization pressure, and the pressure may be within the range that is sufficient to maintain the monomer and the solvent as liquid phase at the above temperature range.

As described above, the solution containing the aromatic vinyl polymer that includes an active terminal may be obtained by polymerizing the aromatic vinyl monomer using the polymerization initiator in the solvent. This aromatic vinyl polymer that includes an active terminal is the one that configures the aromatic vinyl polymer block $Ar^a$ in the block copolymer A1, the aromatic vinyl polymer block $Ar^b$ in the block copolymer A2, and the aromatic vinyl polymer block $Ar1^c$ having comparatively small weight average molecular weight in the block copolymer A3 configuring the block copolymer A. Thus, the amount of the aromatic vinyl monomer used on this occasion is determined depending on the intended weight average molecular weight of these polymer blocks.

Step 2a

Next, a conjugated diene monomer is added to the solution containing the aromatic vinyl polymer that includes an active terminal, obtained in the step 1a above.

A conjugated diene polymer chain is formed from the active terminal by the addition of this conjugated diene monomer, and the solution containing the aromatic vinyl-conjugated diene block copolymer (diblock) that includes the active terminal is obtained. The amount of the conjugated diene monomer used on this occasion is determined depending on the weight average molecular weight of the conjugated diene polymer block ($D^a$) in the intended block copolymer A1.

Step 3a

Next, a coupling agent is added to the solution containing the aromatic vinyl-conjugated diene block copolymer (diblock) that includes an active terminal, obtained in the step 2a above, so that the functional group to the active terminal is in the amount of less than equivalent to 1 mol. The coupling agent is the same as that described above.

The amount of the coupling agent to be added is determined in accordance with the ratio of the block copolymer A1, the bock copolymer A2, and the block copolymer A3 configuring the block copolymer A, and not particularly limited if the amount is such that the functional group in the coupling agent to the active terminal in the polymer is less than equivalent to 1 mol, but usually, the functional group in the coupling agent to the active terminal in the polymer is in a range of equivalent to 0.10 to 0.90 mol, and preferably in a range of equivalent to 0.15 to 0.70 mol.

As described above, when the coupling agent is added to the solution containing the aromatic vinyl-conjugated diene block copolymer (diblock) that includes an active terminal, so that the functional group to the active terminal is in the amount of less than equivalent to 1 mol, in a part of the copolymer among the aromatic vinyl-conjugated diene block copolymer (diblock) that includes an active terminal, conjugated diene polymer blocks are bonded to each other via the residue of the coupling agent; as the result, the block copolymer A1 that configures the block copolymer A is formed. Then, a part of remaining aromatic vinyl-conjugated diene block copolymer (diblock) that includes an active terminal is left unreacted in the solution.

Step 4a

Next, a polymerization terminator is added to the solution containing the block copolymer A1 and the aromatic vinyl-conjugated diene block copolymer (diblock) that includes the active terminal, obtained in the step 3a above, in an amount of less than equivalent to 1 mol to the active terminal.

Examples of the polymerization terminator may include water, monohydric alcohol such as methanol and ethanol, and monohydric phenol such as phenol and cresol.

The amount of the polymerization terminator to be added is determined in accordance with the ratio of the block copolymer A1, the bock copolymer A2, and the block copolymer A3 those configures the block copolymer A, and not particularly limited if the amount is less than equivalent to 1 mol to the active terminal in the polymer, but the polymerization terminator to the active terminal in the polymer is usually in a range of equivalent to 0.18 to 0.91 mol, and preferably in a range of equivalent to 0.35 to 0.80 mol.

When the polymerization terminator is added to the solution, a part of the active terminal among the aromatic vinyl-conjugated diene copolymer (diblock) that includes an active terminal left unreacted with the coupling agent is deactivated; as the result, the polymer of which active terminal is deactivated becomes the block copolymer A2 that is the aromatic vinyl-conjugated diene block copolymer (diblock) configuring the block copolymer A. Then, a part of the remaining aromatic vinyl-conjugated diene block copolymer (diblock) that includes an active terminal not reacted with the polymerization terminator is left as it is in the solution.

Step 5a

Next, an aromatic vinyl monomer is added to the solution obtained in the step 4a above.

When the aromatic vinyl monomer is added to the solution, an aromatic vinyl polymer chain is formed from the end of the aromatic vinyl-conjugated diene block copolymer (diblock) that includes an active terminal left unreacted with the coupling agent and the polymerization terminator; as the result, an asymmetric aromatic vinyl-conjugated diene-aromatic vinyl triblock copolymer that configures the block copolymer A3 is formed. This aromatic vinyl polymer chain is the one that configures the aromatic vinyl polymer block $Ar2^c$ having comparatively large weight average molecular weight in the block copolymer A3 configured in the block copolymer A. Thus, the amount of the aromatic vinyl monomer used on this occasion is determined depending on the intended weight average molecular weight of the aromatic vinyl polymer block $Ar2^c$. From this step, a solution containing the block copolymer A1, the block copolymer A2, and the block copolymer A3, is obtained.

Incidentally, a conjugated diene monomer may be added to the solution including the aromatic vinyl-conjugated diene block copolymer (diblock) including an active terminal not reacted with the coupling agent and the polymerization terminator, before this step of adding the aromatic vinyl monomer. When the conjugated diene monomer is added in this manner, the weight average molecular weight of the conjugated diene polymer block ($D^c$) in the block copolymer A3 may be increased more compared to the case of not adding the monomer.

Step 6a

Next, the intended block copolymer A is collected from the solution containing the block copolymer A obtained in the step 5a above. The collecting method may be according to a normal method and not particularly limited. For example, it may be collected by adding a polymerization terminator such as water, methanol, ethanol, propanol, hydrochloric acid, and citric acid after the completion of reaction, and further adding an additive such as antioxidant as required, then applying a publicly known method such as a direct drying method and steam stripping to the solution. If the block copolymer A is collected as a slurry when a method such as steam stripping is applied, it may be dehydrated using an arbitrary dehydrator such as an extruding type squeezer to obtain a crumb having water content of specific value or less, and the crumb may be further dried using an arbitrary drying machine such as a hand dryer or an expansion extruding drying machine.

Also, the obtained block copolymer A may be used after processing thereof to a pellet shape and the like in accordance with a usual method.

Second Embodiment

The second embodiment of the method for producing the block copolymer A is a method for producing the block copolymer A that is a mixture including the block copolymer A1, the block copolymer A2, and the block copolymer A3, the method comprising below steps 1b to 7b:

1b: a step of polymerizing an aromatic vinyl monomer using a polymerization initiator in a solvent;

2b: a step of adding a conjugated diene monomer to a solution containing an aromatic vinyl polymer that includes an active terminal obtained in the step 1b above;

3b: a step of forming the block copolymer A2 by adding a polymerization terminator to the solution containing the aromatic vinyl-conjugated diene block copolymer that includes the active terminal, obtained in the step 2b above, in an amount of less than equivalent to 1 mol to the active terminal;

4b: a step of adding an aromatic vinyl monomer to the solution containing the block copolymer A2 and the aromatic vinyl-conjugated diene block copolymer that includes the active terminal obtained in the step 3b above;

5b: a step of forming the block copolymer A1 by adding a polymerization terminator to the solution containing the block copolymer A2 and an aromatic vinyl-conjugated diene-aromatic vinyl block copolymer that includes the active terminal obtained in the step 4b above, in an amount of less than equivalent to 1 mol to the active terminal;

6b: a step of forming the block copolymer A3 by adding an aromatic vinyl monomer to the solution containing the block copolymer A2, the block copolymer A1, and the aromatic vinyl-conjugated diene-aromatic vinyl block copolymer that includes the active terminal, obtained in the step 5b above; and 7b: a step of collecting the block copolymer A from the solution obtained in the step 6b above.

Step 1b

The step 1b may be the same as the step 1a in the first embodiment.

Step 2b

Next, a conjugated diene monomer is added to the solution containing the aromatic vinyl polymer that includes the active terminal obtained in the step 1b above.

Addition of this conjugated diene monomer forms a conjugated diene polymer chain from the active terminal, and thus the solution containing the aromatic vinyl-conjugated diene block copolymer (diblock) that includes the active terminal may be obtained. The amount of the conjugated diene monomer used on this occasion is determined so as the conjugated diene polymer chain to be obtain would have half the weight average molecular weight of that of the conjugated diene polymer block ($D^a$) in the intended block copolymer A1.

Step 3b

Next, a polymerization terminator is added to the solution containing the aromatic vinyl-conjugated diene block copolymer (diblock) that includes the active terminal, obtained in the step 2b above, in an amount of less than equivalent to 1 mol to the active terminal. The polymerization terminator may be the same as that in the first embodiment.

When the polymerization terminator is added to the solution, a part of the active terminal in the aromatic vinyl-conjugated diene block copolymer (diblock) that includes the active terminal is deactivated; as the result, the polymer of which active terminal is deactivated becomes the block copolymer A2, that is an aromatic vinyl-conjugated diene block copolymer (diblock) configuring the block copolymer A. Then, remaining part of the aromatic vinyl-conjugated diene block copolymer (diblock) that includes the active terminal not reacted with the polymerization terminator would be left as it is in the solution.

Step 4b

Next, an aromatic vinyl monomer is added to the solution containing the block copolymer A2 and the aromatic vinyl-conjugated diene block copolymer (diblock) that includes the active terminal obtained in the step 3b above.

Addition of the aromatic vinyl monomer form an aromatic vinyl polymer chain from the active terminal, and thus the solution containing the aromatic vinyl-conjugated diene-aromatic vinyl block copolymer that includes the active terminal may be obtained. This aromatic vinyl polymer chain is to configure the aromatic vinyl polymer block ($Ar^a$) in the block copolymer A1, and the aromatic vinyl polymer block ($Ar1^c$) having comparatively small weight average molecular weight in the block copolymer A3. Thus, the amount of the aromatic vinyl monomer used on this occasion is determined according to the intended weight average molecular weight of these polymer blocks.

Step 5b

Next, a polymerization terminator is added to the solution containing the block copolymer A2 and an aromatic vinyl-conjugated diene-aromatic vinyl block copolymer that includes the active terminal obtained in the step 4b above, in an amount of less than equivalent to 1 mol to the active terminal. The polymerization terminator may be the same as that in the first embodiment.

When the polymerization terminator is added to the solution, a part of the active terminal in the aromatic vinyl-conjugated diene-aromatic vinyl block copolymer that includes the active terminal is deactivated, and the polymer of which active terminal is deactivated becomes the block copolymer A1. Then, remaining part of the aromatic vinyl-conjugated diene-aromatic vinyl block copolymer that includes the active terminal not reacted with the polymerization terminator would be left as it is in the solution.

Step 6b

Next, a polymerization terminator is added to the solution containing the block copolymer A1, the block copolymer A2, and the aromatic vinyl-conjugated diene-aromatic vinyl block copolymer that includes the active terminal, obtained in the step 5b above, in an amount of less than equivalent to 1 mol to the active terminal. The polymerization terminator may be the same as that in the first embodiment.

When the aromatic vinyl monomer is added to the solution, the aromatic vinyl monomer is further polymerized from the aromatic vinyl polymer chain at the active terminal side of the aromatic vinyl-conjugated diene-aromatic vinyl block copolymer that includes the active terminal remained unreacted with the polymerization terminator, and thus the aromatic vinyl polymer chain is extended so as to obtain the aromatic vinyl-conjugated diene-aromatic vinyl triblock copolymer, which may be the block copolymer A3 configuring the block copolymer A. At this time, the aromatic vinyl polymer chain to be extended is the one to configure the aromatic vinyl polymer block $Ar2^c$ having comparatively large weight average molecular weight in the block copolymer A3 configuring the block copolymer A. Thus, the amount of the aromatic vinyl monomer used on this occasion is determined according to the intended weight average molecular weight of the aromatic vinyl polymer block ($Ar2^c$) in consideration of the weight average molecular weight of the aromatic vinyl polymer block before being extended.

From this step, an asymmetric aromatic vinyl-conjugated diene-aromatic vinyl triblock copolymer that is to configure the block copolymer A3 is formed, and as the result, the solution containing the block copolymer A1, the block copolymer A2, and the block copolymer A3 is obtained.

Step 7b

The step 7b may be the same as the step 6a in the first embodiment.

Third Embodiment

The third embodiment of the method for producing the block copolymer A is a method for producing the block copolymer A that is a mixture including the block copolymer A1 and the block copolymer A3, the method comprising below steps 1c to 5c:

1c: a step of polymerizing an aromatic vinyl monomer using a polymerization initiator in a solvent;

2c: a step of adding a conjugated diene monomer to a solution containing an aromatic vinyl polymer that includes an active terminal obtained in the step 1c above;

3c: a step of forming the block copolymer A1 by adding a coupling agent to the solution containing an aromatic vinyl-conjugated diene block copolymer that includes the active terminal obtained in the step 2c above so that a functional group to the active terminal is in the amount of less than equivalent to 1 mol;

4c: a step of forming the block copolymer A3 by adding an aromatic vinyl monomer to the solution containing the block copolymer A1 and the aromatic vinyl-conjugated diene block copolymer that includes the active terminal, obtained in the step 3c above; and 5c: a step of collecting the block copolymer A from the solution obtained in the step 4c above.

The third embodiment is a method not conducting the step 4a in the first embodiment. The steps 1c to 5c may be respectively the same as the steps 1a to 3a and 5a to 6a in the first embodiment.

Fourth Embodiment

The second embodiment of the method for producing the block copolymer A is a method for producing the block copolymer A that is a mixture including the block copolymer A1 and the block copolymer A3, the method comprising below steps 1d to 6d:
- 1d: a step of polymerizing an aromatic vinyl monomer using a polymerization initiator in a solvent;
- 2d: a step of adding a conjugated diene monomer to a solution containing an aromatic vinyl polymer that includes an active terminal obtained in the step 1d above;
- 3d: a step of adding an aromatic vinyl monomer to the solution containing an aromatic vinyl-conjugated diene block copolymer that includes the active terminal obtained in the step 2d above;
- 4d: a step of forming the block copolymer A1 by adding a polymerization terminator to the solution containing an aromatic vinyl-conjugated diene-aromatic vinyl block copolymer that includes the active terminal obtained in the step 3d above, in an amount of less than equivalent to 1 mol to the active terminal;
- 5d: a step of forming the block copolymer A3 by adding an aromatic vinyl monomer to the solution containing the block copolymer A1 and the aromatic vinyl-conjugated diene-aromatic vinyl block copolymer that includes the active terminal, obtained in the step 4d above; and
- 6d: a step of collecting the block copolymer A from the solution obtained in the step 5d above.

The fourth embodiment is a method not conducting the step 3b in the second embodiment. The steps 1d to 6d may be respectively the same as the steps 1b to 2b and 4b to 7b in the second embodiment.

When the block copolymer A is produced in the manner above, the block copolymer A1, the block copolymer A2, and the block copolymer A3 may be continuously obtained in the same reaction container, and thus the intended block copolymer A may be obtained in extremely excellent productivity compared to the case of producing each of the block copolymer separately and mixing thereof. On top of that, the block copolymer A to be obtained would have particularly desirable balance of the weight average molecular weight of each polymer block in each of the block copolymer as the block copolymer A to configure the block copolymer composition of the present invention; thus, a block copolymer composition highly balanced in high elasticity and small tension set may be obtained.

(2) First Step

In the first step, an unsaturated carboxylic acid or an unsaturated dicarboxylic acid anhydride is brought into reaction with the block copolymer A to obtain a modified block copolymer C to which a carboxyl group or an acid anhydride group is introduced. In other words, the block copolymer A is acid-modified with the unsaturated carboxylic acid or the unsaturated dicarboxylic acid anhydride to obtain the modified block copolymer C. Incidentally, the acid-modification may be conducted once or multiple times. Also, when the acid-modification is to conduct multiple times, the conditions for the acid-modification may be the same and may be different in each time.

The unsaturated carboxylic acid and the unsaturated dicarboxylic acid anhydride used as an acid modifier in the acid-modification reaction are as described above. The unsaturated carboxylic acid and the unsaturated dicarboxylic acid anhydride may be used solely or in combination of two kinds or more.

The amount of use of the unsaturated carboxylic acid and the unsaturated dicarboxylic acid anhydride per 100 parts by mass of the block copolymer A is usually 0.01 to 200 parts by mass, and preferably 0.05 to 100 parts by mass.

Reaction temperature for the acid modification reaction may be usually set within the range of 50 to 300° C. If the reaction temperature is too low, there is a risk that reaction efficiency may be inferior and the content of the unsaturated carboxylic acid and the unsaturated dicarboxylic acid anhydride unreacted in the modified block copolymer C may increase. Also, reaction time may be usually set within the range of 5 minutes to 20 hours. If the reaction time is too short, there is a risk that the reaction efficiency may be inferior and the content of the unsaturated carboxylic acid and the unsaturated dicarboxylic acid anhydride unreacted in the modified block copolymer C may increase.

Also, on the occasion of the acid-modification reaction, as required, an agent such as a diluent, a gelation inhibitor, and a reaction promoting agent may be present.

The acid value of the modified block copolymer C is preferably 1.3 to 1050 KOHmg/g, and above all, preferably 6.5 to 700 KOHmg/g. If the acid value is too low or too high, intended elasticity and stress relaxation properties may not be obtained for the block copolymer composition to be obtained in some cases.

Incidentally, the acid value is, for example, the value measured for the modified block copolymer C in accordance with JIS K 0070.

The introduction rate of the carboxyl group and the acid anhydride group in the modified block copolymer C may be, for example, per 100 mol % of the conjugated diene monomer unit in the modified block copolymer C, in a range of 2.5 mol % or more and 25 mol % or less, and is preferably in a range of 5 mol % or more and 20 mol % or less. If the introduction rate of the carboxyl group and the acid anhydride group is too low or too high, intended elasticity and stress relaxation properties may not be obtained for the block copolymer composition to be obtained in some cases. Incidentally, the introduction rate of the carboxyl group and the acid anhydride group may be calculated using $^1$H-NMR. Also, whether the carboxyl group and the acid anhydride group are introduced or not can be confirmed by the $^1$H-NMR and/or an infrared spectroscopic analysis.

After the acid modification reaction, it is preferable to remove unreacted unsaturated carboxylic acid and unsaturated dicarboxylic acid anhydride.

(3) Second Step

In the second step, a base treatment is conducted to the modified block copolymer C to obtain the block copolymer B to which the functional group capable of forming a non-covalent bond is introduced. Incidentally, the base treatment may be conducted once or multiple times. Also, if the base treatment is to conduct multiple times, the conditions for the base treatment may be the same, or may be different in each time.

The base used in the base treatment is as described above. The base may be used solely or in combination of two kinds or more.

The base treatment varies with the kind of the carboxyl group and the acid anhydride group introduced to the modified block copolymer C, and the kind of the base. For example, in the case of the carboxyl group and the acid anhydride group, when ammonia, the primary amine compound, and the secondary amine compound are used as the base, in the base treatment, the carboxyl group or the acid anhydride group is brought into reaction with the base so as to obtain the functional group capable of forming a non-covalent bond. In other words, in this case, in the base treatment, the modified block copolymer C may be modified with the amine. Also, for example, in the case of the acid anhydride group, when the alkali metal-containing compound, the alkali earth metal-containing compound, and the tertiary amine compound are used as the base, in the base treatment, the hydrolysis decomposition of the acid anhydride group is conducted with the base to obtain the functional group capable of forming a non-covalent bond.

The amount of use of the base is appropriately selected in accordance with the kind of the base treatment. For example, in the base treatment, when the carboxyl group or the acid anhydride group are brought into reaction with the base and, for example, when the modification is conducted with amines, the amount of use of the base may be equimolar or more of the carboxyl group or the acid anhydride group introduced to the modified block copolymer C, and it may be specifically 1 to 2 times the mole. Also, for example, in the base treatment, when the hydrolysis decomposition of the acid anhydride group is conducted with the base to obtain a carboxyl group, there are no particular limitations on the amount of use of the base; for example, it may be equimolar or more of the acid anhydride group introduced to the modified block copolymer C.

The base treatment may be conducted without a solvent, and may be conducted in a solvent. If the base treatment is conducted in a solvent, examples of the solvent may include C1-2 aliphatic halogenated hydrocarbons such as 1,2-dichloroethane, chloroform, dichloromethane, and 1,1-dichloroethane; aliphatic cyclic hydrocarbons such as cyclohexane, methylcyclohexane, and cyclopentane; nitromethane, nitrobenzene, acetonitrile, tetrahydrofuran, tetrahydropiran, 1,2-dimethoxyethane, acetone, methyl ethyl ketone, dimethyl sulfoxide, dimethylformamide, pyrrolidone, and water. The solvent may be used solely, and two kinds or more thereof may be used in combination.

The reaction temperature of the base treatment varies with the kind of the carboxyl group and the acid anhydride group introduced to the modified block copolymer C, and the kind of the base but, for example, it may be 0 to 200° C., and is preferably 10 to 150° C. If the reaction temperature is too low, there is a risk that the reaction speed may be slower, and if the reaction temperature is too high, there is a risk that the block copolymer C may be thermally decomposed. Also, the reaction time varies with the reaction temperature but, for example, it may be 1 minute to 40 hours, and is preferably 3 minutes to 2 hours. If the reaction time is too short, there is a risk that the reaction may not sufficiently proceed, and if the reaction time is too long, there is a risk that the reaction efficiency may be inferior.

After the base treatment, residual base is preferably removed. The method of removal may be appropriately selected in accordance with the kind of the base treatment and the base, and examples of the method may include cleaning, neutralization, filtration, and drying.

The functional group capable of forming a non-covalent bond and the introduction rate thereof are as described above.

5. Applications

There are no particular limitations on the applications of the block copolymer composition of the present invention and examples thereof may include a wide range of technical fields such as the medical field, the adhesive field, the electronics field, and the optics field. Examples of the applications may include an application as a material for molding goods such as a film, gloves, an elastic band, a contraceptive device, an OA equipment, various roles such as one for office usage, a vibration proof sheet for an electrical and electronic equipment, anti-vibration rubber, a shock-absorbing sheet, a shock absorbing film and sheet, and a residential damping sheet, a damping damper material; an application as a pressure sensitive adhesive used in materials such as an adhesive tape, an adhesive sheet, an adhesive label, and a roller for collecting garbage; an application as an adhesive used in materials such as hygiene supplies and book binding; and an application as an elastic fiber used in materials such as apparel and sporting goods.

B. Film

The film of the present invention is a film containing 0 to 40 parts by mass of an aromatic vinyl polymer and 0 to 20 parts by mass of a polyolefin-based thermoplastic resin per 100 parts by mass of the above described block copolymer composition.

The film of the present invention is strong and rich in elasticity since the above described block copolymer composition is used therein.

Incidentally, the block copolymer composition is described above; thus, the description herein is omitted.

1. Aromatic Vinyl Polymer

The film of the present invention may include an aromatic vinyl polymer. The aromatic vinyl polymer is included and thus the film having excellent moldability, strong and rich in elasticity may be obtained.

The aromatic vinyl polymer used in the present invention is a polymer having a repeating unit derived from an aromatic vinyl monomer.

There are no particular limitations on the content of the aromatic vinyl polymer in the film of the present invention, but per 100 parts by mass of the above described block copolymer composition, it is 0 to 20 parts by mass, preferably 15 parts by mass or less, and more preferably 10 parts by mass or less.

In the present invention, usually used is at least one kind of the aromatic vinyl polymer selected from the below α to γ:

α: polymer (α) of aromatic vinyl monomer

β: aromatic vinyl-conjugated diene block copolymer (β)

γ: hydrogenated (γ) aromatic vinyl-conjugated diene block copolymer.

(1) Polymer (α) of Aromatic Vinyl Monomer

Examples of the aromatic vinyl monomer used in the polymer (α) of aromatic vinyl monomer may include styrene; alkylstyrene such as p-, m-, or o-methylstyrene, 2,4-, 2,5-, 3,4-, or 3,5-dimethylstyrene, and p-t-butylstyrene; halogenated styrene such as o-, m-, or p-chlorostyrene, o-, m-, or p-bromostyrene, o-, m-, or p-fluorostyrene, and o-methyl-p-fluorostyrene; halogenated substituted alkylstyrene such as o-, m-, or p-chloromethylstyrene; polyalkoxystyrene such as p-, m-, or o-methoxystyrene and o-, m-, or p-ethoxystyrene; carboxyalkylstyrene such as o-, m-, or p-carboxymethylstyrene; alkyletherstyrene such as p-vinylbenzylpropylether; alkylsilylstyrene such as p-trimethylsilylstyrene; and further, vinylbenzyl dimethoxy phosphite. In particular, a general example is styrene. These may be used not only in one kind, but also two kinds or more may be used in combination.

The polymer (α) of aromatic vinyl monomer may be a copolymer of the aromatic vinyl monomer and a monomer capable of copolymerization therewith. Examples of the monomer capable of copolymerizing with the aromatic vinyl monomer may include an aliphatic unsaturated carboxylic acid ester such as methyl(meth)acrylate, butyl(meth)acrylate, 2-ethylhexyl(meth)acrylate, lauryl(meth)acrylate, and stearyl(meth)acrylate.

The weight average molecular weight (Mw) of the polymer (α) of aromatic vinyl monomer is usually 50,000 or more, preferably 80,000 or more, and also usually 500,000 or less, preferably 450,000 or less, and further preferably 400,000 or less. When the weight average molecular weight (Mw) of the polymer (α) of aromatic vinyl monomer is in the above range or more, the film would not be deteriorated; thus, it is preferable. Further, when the average weight molecular weight (Mw) of the polymer (α) of aromatic vinyl monomer is in the above range or less, it is not necessary to adjust fluidity characteristic and extruding properties would not be deteriorated; thus, it is preferable.

There are no particular limitations on the melt index of the polymer (α) of aromatic vinyl monomer, but as the value measured based on ASTM D-1238 (G condition, 200° C., 5 kg), it is usually 0.1 g/10 minutes or more, preferably 1 g/10 minutes or more, and usually 40 g/10 minutes or less, preferably 35 g/10 minutes or less, and further preferably 30 g/10 minutes or less. When the melt index is in the above range or more, appropriate fluid viscosity may be obtained during extrusion molding the polymer, and the productivity may be maintained or improved. Also, when the melt index is in the above range or less, appropriate cohesive force of the resin may be obtained, and thus excellent stretch strength of the film may be obtained so as the film is not easily embrittled.

(2) Aromatic Vinyl-Conjugated Diene Block Copolymer (β)

The aromatic vinyl-conjugated diene block copolymer (β) is a diblock copolymer comprising an aromatic vinyl polymer block and a conjugated diene polymer block. The aromatic vinyl-conjugated diene block copolymer (β) may be used solely, and may be used in combination of two kinds or more of the aromatic vinyl-conjugated diene block copolymer of which aromatic vinyl monomer unit content differs from each other. Further, the aromatic vinyl-conjugated diene block copolymer (β) may be the one in which a copolymerizable monomer is polymerized as well, and may be the mixture of those. Also, it may be the mixture with the polymer (α) of aromatic vinyl monomer.

As the aromatic vinyl monomer used in the aromatic vinyl-conjugated diene block copolymer (β), those described in the section "(1) Polymer (α) of aromatic vinyl monomer" above may be exemplified.

Also, the conjugated diene monomer used in the aromatic vinyl-conjugated diene block copolymer (β) may be diolefin including a pair of conjugated double bond, and examples thereof may include 1,3-butadiene, 2-methyl-1,3-butadiene (isoprene), 2,3-dimethyl-1,3-butadiene, 1,3-pentadiene, and 1,3-hexadiene. These may be used not only in one kind, but also used in combination of two kinds or more. Among them, 1,3-butadiene, isoprene, or the mixture of these may be suitably used.

The aromatic vinyl-conjugated diene block copolymer (β) may be a copolymer of an aromatic vinyl monomer, a conjugated diene monomer, and a monomer copolymerizable with the aromatic vinyl monomer or the conjugated diene monomer. Examples of the monomer copolymerizable with the aromatic vinyl monomer may include aliphatic unsaturated carboxylic acid ester such as methyl(meth) acrylate, butyl(meth)acrylate, 2-ethylhexyl(meth)acrylate, lauryl(meth)acrylate, and stearyl(meth)acrylate).

Examples of the aromatic vinyl-conjugated diene block copolymer (β) suitably used in the present invention may include a styrene-butadiene copolymer (SBR) in which the aromatic vinyl monomer is styrene and the conjugated diene monomer is butadiene. The styrene content in the SBR is usually 60 mass % or more, preferably 65 mass % or more, and further preferably 70 mass % or more. Also, the styrene content is usually 95 mass % or less, preferably 90 mass % or less, and further preferably 85 mass % or less. If the styrene content is in the above range or less, the effect of anti-shock properties may be exhibited, and also, if it is in the range or more, the elasticity of the film at the temperature around the room temperature may be maintained and excellently strong tensility may be obtained.

The weight average molecular weight of the aromatic vinyl-conjugated diene block copolymer (β) is usually 100,000 or more, preferably 150,000 or more, and also usually 500,000 or less, preferably 400,000 or less, and further preferably 300,000 or less. When the weight average molecular weight (Mw) of the aromatic vinyl-conjugated diene block copolymer (β) is in the above range or more, the film would not be deteriorated, and thus it is preferable. Further, when the weight average molecular weight (Mw) of the aromatic vinyl-conjugated diene block copolymer (β) is in the above range or less, it is not necessary to adjust fluidity characteristic and the extruding properties would not be deteriorated; thus, it is preferable.

There are no particular limitations on the melt index of the aromatic vinyl-conjugated diene block copolymer (β), but as the value measured based on ASTM D-1238 (G condition, 200° C., 5 kg), it is usually 1 g/10 minutes or more, preferably 2 g/10 minutes or more, and usually 40 g/10 minutes or less, preferably 35 g/10 minutes or less, and further preferably 30 g/10 minutes or less. When the melt index is in the above range or more, appropriate fluid viscosity may be obtained during extrusion molding the copolymer, and the productivity may be maintained or improved. Also, when the melt index is in the above range or less, appropriate cohesive force of the resin may be obtained, and thus excellent stretch strength of the film may be obtained so as the film is not easily embrittled.

Also, in the present invention, a commercially available aromatic vinyl-conjugated diene block copolymer (β) may be used. For example, products such as "PSJ-GPPS" and "PSJ-HIPS" from PS Japan Corporation, "Toyo Styrol GPPS" and "Toyo Styrol HIPS" from TOYO STYRENE CO., LTD., and "DICSTYRENE" from DIC Corporation may be used.

(3) Hydrogen Additive (γ) of Aromatic Vinyl-Conjugated Diene Block Copolymer

In the present invention, the hydrogen additive (γ) of aromatic vinyl-conjugated diene block copolymer is formed such that hydrogen is added to the unsaturated double bond based on the conjugated diene monomer unit prior to the addition of hydrogen.

The content of the aromatic vinyl monomer unit in the whole constituent units of the aromatic vinyl-conjugated diene block copolymer in the hydrogen additive (γ) of aromatic vinyl-conjugated diene block copolymer is preferably 60 mass % or more, more preferably 65 mass % or more, preferably 90 mass % or less, and more preferably 85 mass % or less. If the content is the above value or more, the transparency of the film may be maintained, and if the content is the above value or less, properties of anti-break caused by insufficient stretch may be inhibited from being degraded, and also, from the aspect of producing a polymer, the value is preferable since the effect of safing reduction catalyst during the addition of hydrogenation may be secured.

Also, in the present invention, a commercially available hydrogenated (γ) aromatic vinyl-conjugated diene block copolymer may also be used. For example, "Tuftec™" from Asahi Kasei Corporation and "SEPTON™" from KURARAY CO., LTD. may be used.

2. Polyolefin-Based Thermoplastic Resin

The film of the present invention may include a polyolefin-based thermoplastic resin. The polyolefin-based thermoplastic resin is included and thus the film excellent in moldability may be formed. Also, it allows the conductions of producing film and laminating step with non-woven fabric simultaneously, and on top of that, when the film to be obtained by extrusion-molding is layered with a material such as the non-woven fabric to form a layered body, the layered body may be the one of which material such as non-woven fabric is not easily peeled off.

There are no particular limitations on the polyolefin-based thermoplastic resin used in the present invention if it is a resin with thermal plasticity of which main repeating unit is olefin; for example, it may be a homopolymer of α-olefin, a copolymer of two kinds or more of α-olefin, and a copolymer of α-olefin and a monomer other than α-olefin, and also, it may be these (co)polymers modified.

Specific examples of the polyolefin-based thermoplastic resin may include the homopolymer or the copolymer of α-olefin such as ethylene and propylene: for example, a homopolymer of α-olefin such as polyethylene such as linear low density polyethylene (LLDPE), low density polyethylene (LDPE), middle density polyethylene (MDPE), high density polyethylene (HDPE), and metallocene polyethylene, polypropylene, metallocene polypropylene, polymethylpentene, and polybutene; the copolymer of ethylene with other α-olefin such as an ethylene-propylene random copolymer, ethylene-propylene block copolymer, an ethylene-butene-1 copolymer, an ethylene-propylene-butene-1 copolymer, and an ethylene-cyclic olefin copolymer; the copolymer of α-olefin with carboxylic acid unsaturated alcohol mainly composed of α-olefin, and its saponificate such as an ethylene-vinyl acetate copolymer and an ethylene-vinyl alcohol copolymer; the copolymer of α-olefin with α,β-unsaturated carboxylic acid ester or α,β-unsaturated carboxylic acid or the like mainly composed of α-olefin such as an ethylene-α,β-unsaturated carboxylic acid ester copolymer (such as an ethylene-acrylic acid ethyl copolymer and an ethylene-methacrylic acid methyl copolymer), and an ethylene-α,β-unsaturated carboxylic acid copolymer (such as an ethylene-acrylic acid copolymer and an ethylene-methacrylic acid copolymer); an acid-modified olefin resin such that an α-olefin (co)polymer such as polyethylene and polypropylene is modified with unsaturated carboxylic acid and/or their anhydride such as acrylic acid, methacrylic acid, maleic acid, maleic anhydride, fumaric acid, and itaconic acid; an ionomer resin such that the copolymer of ethylene with methacrylic acid or the like is brought into action with Na ion, Zn ion, or the like; and the mixture of these. The polyolefin-based thermoplastic resin may be used in one kind alone, and two kinds or more may be used in combination.

Among these, polyethylene or the copolymer of ethylene with other α-olefin is preferable, and above all, polyethylene produced using a metallocene catalyst or the copolymer of ethylene with other α-olefin is particularly preferable.

The weight average molecular weight of the polyolefin-based thermoplastic resin is not particularly limited, but usually selected within the range of 10,000 to 5,000,000, and preferably selected within the range of 50,000 to 800,000. Also, there are no particular limitations on the specific weight and the melt index of the polyolefin-based thermoplastic resin; however, the specific weight is usually selected within the range of 0.80 to 0.95 $g/cm^3$, preferably selected within the range of 0.85 to 0.94 $g/cm^3$, and the melt index is, as the value measured based on ASTM D-1238 (G condition, 200° C., 5 kg), usually selected within the range of 1 to 1000 g/10 minutes, and preferably selected within the range of 3 to 500 g/10 minutes.

There are no particular limitations on the content of the polyolefin-based thermoplastic resin in the film of the present invention; however, per 100 parts by mass of the block copolymer composition, the content is 0 to 40 parts by mass, preferably 15 parts by mass or less, and more preferably 10 parts by mass or less.

3. Other Components

The film of the present invention may include a component other than the above described block copolymer composition, aromatic vinyl polymer, and polyolefin-based thermoplastic resin; for example, an additive such as a tackifying resin, a softener, an antioxidant, an antimicrobial agent, an light stabilizer, an ultraviolet absorbent, a dye, a lubricant, a cross-linking agent, and a cross-linking promoter may be blended as required.

4. Film

The film of the present invention is excellent in flexibility. As the flexibility of the film, for example, when the film is stretched to 1300% strain and kept as it is for 47 hours, then a tensile load thereto is released, and left as it is for 47 hours, a recovery of the film is preferably 60% or more, more preferably 75% or more, and particularly preferably 90% or more.

The recovery of the film may be obtained from the below formula in the manner such that a dog bone shaped test piece having 4 mm width is collected from the film, and the test piece is stretched to 1300% at the initial strain speed of 1.5/s using AUTOGRAPH AGS-X from Shimadzu Corporation and kept as it is for 47 hours, then uninstalled from the test machine and left as it is for 47 hours so as to recover:

Recovery (%)=(distance between grippers right after stretching–distance between grippers after recovery)/(distance between grippers right after stretching–distance between grippers before stretching)*100.

Incidentally, the distance between grippers right after stretching signifies the distance between grippers in the state the film is stretched to 1300% using AUTOGRAPH AGS-X from Shimadzu Corporation.

5. Method for Producing Film

The film of the present invention may be obtained by preparing a composition for film including at least the above described block copolymer composition and molding the composition for film.

There are no particular limitations on the method for mixing the block copolymer composition, the aromatic vinyl polymer, the polyolefin-based thermoplastic resin and various additives for producing the composition for film, and examples of the method may include a method in which each component is dissolved in a solvent and mixed uniformly and then the solvent is removed by means such as heating, and a method of mixing each component by heating and melting thereof with means such as a kneader.

There are no particular limitations on the melt index of the composition for film overall; however, as the value measured based on ASTM D-1238 (G condition, 200° C., 5 kg), it is usually 1 to 1000 g/10 minutes, preferably 5 to 700 g/10 minutes, and more preferably 5 to 500 g/10 minutes. In this range, the moldability of the composition for film would be particularly excellent.

There are no particular limitations on the method for molding the composition for film, and a conventionally known method for molding films may be used. The composition for film including the above described block copolymer composition exhibits its excellent moldability when extrusion molding method is applied in particular; thus, the extrusion molding method is preferable, and above all, the extrusion molding method using a T-die is particularly suitable. Specific examples of the extrusion molding method using a T-die may include a method in which the composition for film melted at the temperature of 150 to 250° C. is extruded from a T-die installed to a uniaxial extruding machine or a biaxial extruding machine, and the extruded component is rolled to be collected while being cooled with a pulling and collecting roll. The film may be stretched when it is cooled with the pulling and collecting roll.

Also, in order to obtain the film of the present invention, a method of spray-coating the composition for film to a base material such as nonwoven fabric may be applied as well.

The thickness of the film of the present invention is appropriately adjusted according to its application, but when it is to be a film for sanitary goods such as a paper diaper and a sanitary product, the thickness is usually 0.01 to 50 mm, preferably 0.03 to 1 mm, and more preferably 0.05 to 0.5 mm.

The film of the present invention may be used as it is as a single layer, and may be used as a multi-layered body which is layered with an additional member, depending on its applications. Specific examples of the case when it is used as it is as a single layer may include usage as a elastic film used for sanitary goods such as a paper diaper and a sanitary product, a protective film for protecting films such as optical film, and a heat shrinkable film used as the shrinkable package of container and a heat shrinkable label. Specific examples of the case when it is used as a multi-layered body may include molding an elastic gather member by slit processing the film of the present invention, subsequently applying a hot melt adhesive or the like on the processed film to obtain a tape, adhering this tape to a non-woven fabric, a woven fabric, a plastic film or a laminate thereof while the tape is in a shrunk state, and relaxing the shrinkage of the tape. Furthermore, the film may also be appropriately processed by a known method in accordance with other applications, and may be used as an elastic member for elastic base materials for poultice, gloves, surgical gloves, finger cots, hemostatic bands, birth control devices, head bands, goggle bands, rubber bands and the like.

The present invention is not limited to the embodiments. The embodiments are exemplifications and any other variations are intended to be included in the technical scope of the present invention if they have substantially the same constitution as the technical idea described in the claim of the present invention and offer similar operations and effects thereto.

EXAMPLES

Hereinafter, the present invention is explained in more details with reference to Examples and Comparative Examples. Incidentally, unless particularly stated otherwise, parts and percentage (%) in the various Examples are on a mass basis.

Various measurements were conducted based on the below methods.

[Weight Average Molecular Weight of Block Copolymer]

It was measured by high performance liquid chromatography using tetrahydrofuran (THF) with the flow speed of 0.35 ml/minute as a carrier, and calculated relative to polystyrene standards. The measurement was carried out by a device HLC8320™ manufactured by Tosoh Corporation, with three connected columns of SHODEX (registered trademark) KF-404HQ manufactured by SHOWA DENKO K.K (column temperature 40° C.), and a differential refractometer and an ultraviolet detector as detectors, and using twelve samples of polystyrene standards (from 500 to 3,000,000) manufactured by Polymer Laboratories Ltd. for the calibration of the molecular weight.

[Weight Average Molecular Weight of Styrene Polymer Block]

The block copolymer was brought into reaction with ozone according to the method described in Rubber Chem. Technol., 45, 1295 (1972), and was reduced using lithium aluminum hydride, and thereby, the isoprene polymer block in the block copolymer was decomposed. In specific, following procedures were conducted: 300 mg of a sample was dissolved in a reaction vessel containing 100 ml of dichloromethane that had been treated with a molecular sieve. This reaction vessel was placed in a cooling tank, the temperature was set at −25° C., and ozone generated by an ozone generator was introduced into the reaction vessel while oxygen was allowed to flow thereinto at a flow rate of 170 ml/min. After 30 minutes from the initiation of the reaction, it was checked whether the reaction had ended by introducing the gas discharged out from the reaction vessel into an aqueous solution of potassium iodide. Subsequently, 50 ml of diethyl ether and 470 mg of lithium aluminum hydride were introduced into another reaction vessel that had been purged with nitrogen, and while the reaction vessel was cooled with ice water, the solution that had reacted with ozone was slowly added dropwise to this reaction vessel. Then, the reaction vessel was placed in a water bath to raise the temperature slowly, and the reaction solution was refluxed at 40° C. for 30 minutes. Thereafter, dilute hydrochloric acid was added dropwise in small amounts while the solution was stirred, and dropwise addition was continued until generation of hydrogen was almost not recognized. After this reaction, the solid product generated in the solution was separated by filtration, and the solid product was extracted with 100 ml of diethyl ether for 10 minutes. This extract was combined with the filtrate obtained at the time of separation by filtration, and the solvent was distilled off. Thus, a solid sample was obtained. For the sample obtained as such, the weight average molecular weight was measured according to the method for measuring the weight average molecular weight described above, and the value was designated as the weight average molecular weight of the styrene polymer block.

[Weight Average Molecular Weight of Isoprene Polymer Block]

The weight average molecular weight of the corresponding styrene polymer block was subtracted from the weight average molecular weight of each block copolymer determined as described above, and the weight average molecular weight of the isoprene polymer block was determined based on the calculation value.

[Styrene Unit Content of Block Copolymer]

The styrene unit content was determined based on $^1$H NMR measurement.

[Vinyl Bond Content of Isoprene Polymer Block]

The vinyl bond content was determined based on $^1$H NMR measurement.

Production Example 1

In a pressure-resistant reactor, 889 g of cyclohexane, 0.12 millimoles of N,N,N',N'-tetramethylethylenediamine (hereinafter, referred to as TMEDA), and 45.0 g of styrene were introduced, and while the content was stirred at 40° C., 4.63 millimoles of n-butyllithium was added thereto, and polymerization was conducted for an hour while raising the temperature to 50° C. The polymerization conversion ratio of styrene was 100%. Subsequently, 410 g of isoprene was continuously added to the reactor over one hour while the temperature was controlled to be maintained at 50° C. to 60° C. After the addition of isoprene was completed, polymerization was carried out for another one hour. The polymerization conversion ratio of isoprene was 100%. After this, 45.0 g of styrene was continuously added to the reactor over one hour while the temperature was controlled to be maintained at 50° C. to 60° C. After the addition of styrene was completed, polymerization was carried out for another one hour, and thus a styrene-isoprene-styrene triblock copolymer was formed. The polymerization conversion ratio of styrene was 100%. After this, 13.89 millimoles of methanol as a polymerization terminator was added to the reactor and mixed thoroughly therein to terminate the reaction.

Incidentally, the amounts of the various reagents used in the reaction are summarized in Table 1. A portion of the obtained reaction liquid was taken out, and the weight average molecular weight of the block copolymer, the weight average molecular weight of each styrene polymer block, the weight average molecular weight of each isoprene polymer block, the styrene unit content of the block copolymer, and the vinyl bond content of the isoprene polymer block were determined. These values are shown in Table 2.

TABLE 1

|  | Production Example | | |
|---|---|---|---|
|  | 1 | 2 | 3 |
| Cyclohexane (g) | 889 | 889 | 889 |
| TMEDA (mmol.) | 0.12 | 0.12 | 0.22 |
| n-butyllithium (mmol.) | 4.63 | 3.99 | 4.72 |
| Styrene (g) [First polymerization] | 45.0 | 36.8 | 75.0 |
| Isoprene (g) [Second polymerization] | 410 | 410 | 425 |
| Styrene (g) [Third polymerization] | 45.0 | 36.8 | — |
| Methanol (mmol.) [After third polymerization] | 13.89 | 3.11 | 12.15 |
| Styrene (g) [Fourth polymerization] | — | 16.5 | — |
| Methanol (mmol.) [After fourth polymerization] | — | 2.63 | — |

TABLE 2

|  | Production Example | | |
|---|---|---|---|
|  | 1 | 2 | 3 |
| Block copolymer (A1) | | | |
| Weight average molecular weight of styrene block (Ar$^a$) | 12000 | 10000 | — |
| Weight average molecular weight of isoprene block (D$^a$) | 154000 | 158000 | — |
| Vinyl bond content of isoprene block (D$^a$) (%) | 7 | 7 | — |
| Weight average molecular weight of block copolymer (A1) | 178000 | 178000 | — |
| Styrene unit content of block copolymer (A1) (%) | 18 | 15 | — |
| Block copolymer (A2) | | | |
| Weight average molecular weight of styrene block (Ar$^b$) | — | — | 17000 |
| Weight average molecular weight of isoprene block (D$^b$) | — | — | 145000 |
| Vinyl bond content of isoprene block (D$^b$) (%) | — | — | 7 |
| Weight average molecular weight of block copolymer (A2) | — | — | 162000 |
| Styrene unit content of block copolymer (A2) (%) | — | — | 15 |
| Block copolymer (A3) | | | |
| Weight average molecular weight of styrene block (Ar1$^c$) | — | 10000 | — |
| Weight average molecular weight of styrene block (Ar2$^c$) | — | 45000 | — |
| Weight average molecular weight of isoprene block (D$^c$) | — | 158000 | — |
| Vinyl bond content of isoprene block (D$^c$) (%) | — | 7 | — |
| Weight average molecular weight of block copolymer (A3) | — | 213000 | — |
| Styrene unit content of block copolymer (A3) (%) | — | 27 | — |
| Mixture of block copolymers (A) (block copolymers A1 + A2 + A3) | | | |
| Weight average molecular weight | 178000 | 187000 | 162000 |
| Styrene unit content (%) | 18 | 18 | 15 |
| Block copolymer (A1)/block copolymer (A2)/block copolymer (A3) (mass ratio) | 100/0/0 | 75/0/25 | 0/100/0 |

Production Example 2

In a pressure-resistant reactor, 889 g of cyclohexane, 0.12 millimoles of TMEDA, and 36.8 g of styrene were introduced, and while the content was stirred at 40° C., 3.99 millimoles of n-butyllithium was added thereto, and polymerization was conducted for an hour while raising the temperature to 50° C. The polymerization conversion ratio of styrene was 100%. Subsequently, 410 g of isoprene was continuously added to the reactor over one hour while the temperature was controlled to be maintained at 50° C. to 60° C. After the addition of isoprene was completed, polymerization was carried out for another one hour. The polymerization conversion ratio of isoprene was 100%. Next, 36.8 g of styrene was continuously added to the reactor over one hour while the temperature was controlled to be maintained at 50° C. to 60° C. After the addition of styrene was completed, polymerization was carried out for another one hour, and thus a solution containing a styrene-isoprene-styrene triblock copolymer including an active terminal was obtained. The polymerization conversion ratio of styrene was 100%. Next, 3.11 millimoles of methanol as a polymerization terminator was added to the reactor and mixed thoroughly therein to deactivate a part of the active terminal in the styrene-isoprene-styrene triblock copolymer including the active terminal so as to obtain a solution containing a styrene-isoprene-styrene triblock copolymer that would be a block copolymer A1. After this, 16.5 g of styrene was continuously added to the reactor over one hour while the temperature was controlled to be maintained at 50° C. to 60° C. After the addition of styrene was completed, polymerization was carried out for another one hour, and thus a solution containing a styrene-isoprene-styrene triblock copolymer including an active terminal that would be a block copolymer A3 was obtained. The polymerization conversion ratio of styrene was 100%. Finally, 2.63 millimoles of methanol as a polymerization terminator was added to the reactor and mixed thoroughly therein to deactivate all of the active terminal in the styrene-isoprene-styrene triblock copolymer including the active terminal so as to complete the polymerization reaction.

The same measurements as for Production Example 1 were carried out to the obtained block copolymers. The results are shown in Table 2.

Production Example 3

In a pressure-resistant reactor, 889 g of cyclohexane, 0.22 millimoles of TMEDA, and 75.0 g of styrene were introduced, and while the content was stirred at 40° C., 4.72 millimoles of n-butyllithium was added thereto, and polymerization was conducted for an hour while raising the temperature to 50° C. The polymerization conversion ratio of styrene was 100%. Subsequently, 425 g of isoprene was continuously added to the reactor over one hour while the temperature was controlled to be maintained at 50° C. to 60° C. After the addition of isoprene was completed, polymerization was carried out for another one hour to form a styrene-isoprene diblock copolymer. The polymerization conversion ratio of isoprene was 100%. After this, 12.15 millimoles of methanol as a polymerization terminator was added to the reactor and mixed thoroughly therein to terminate the reaction.

The same measurements as for Production Example 1 were carried out to the obtained block copolymers. The results are shown in Table 2.

Example 1

In Example 1, the block copolymer (block copolymer composition containing styrene-isoprene-styrene triblock copolymer) of Production Example 1 was used as the block copolymer which was a base polymer, modification with maleic anhydride was conducted thereto according to the below reaction, and a modification treatment with amine was further conducted thereto. Incidentally, the introduction rate (modification rate) of the functional group capable of forming a non-covalent bond was changed within the range of 0.83 to 27.7 mol % and the block copolymer composition was prepared; however, example shown here is the case in which the introduction rate (modification rate) of the functional group capable of forming a non-covalent bond was 10.5 mol %. Specific procedures are shown below.

[Chemical formula 1]

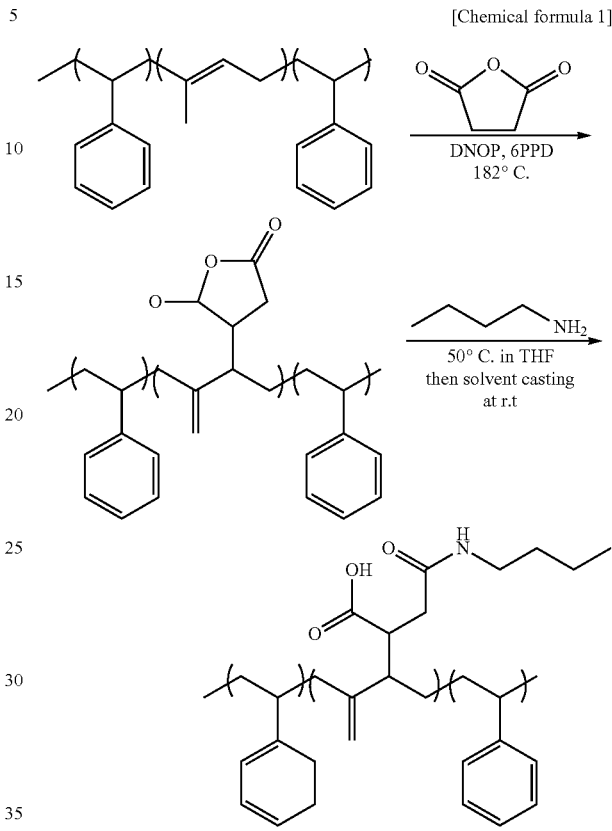

[1-1] First Step (Modification with Maleic Anhydride)

The base polymer: the block copolymer of Production Example 1, the age resistor N-(1,3-dimethylbutyl)-N'-phenyl-1,4-phenylenediamine (hereinafter referred to as 6PPD), and the solvent having a high boiling point: di-n-octyl phthalate (hereinafter, referred to as DNOP), were respectively weighed so as to be 20.0 g, 37.8 mg, and 90.0 g, and mixed in a round bottom flask at a room temperature and stirred by a mechanical stirrer for 17.5 hours. After that, the mixture was stirred in an oil bath at 100° C. for 3.5 hours and thereby a solution was prepared. Maleic anhydride of 10.0 g was added to the solution, and inside the flask was replaced with nitrogen, and then the mixture was stirred in an oil bath at 100° C. for 15 minutes, and thereby a reaction solution was prepared. After the maleic anhydride was completely dissolved, the flask was moved to an oil bath at about 182° C. and the mixture was stirred for 50 minutes to carry out the reaction. After that, the flask was taken out from the oil bath and the reaction was terminated.

Toluene of 180 mL was added to the solution, and this solution was dropped to acetonitrile of 2750 mL to precipitate a block copolymer modified with the maleic anhydride. The obtained polymer was separated by decantation, sufficiently dried by vacuum-drying, then dissolved in the toluene again, and dropped to the acetonitrile to precipitate a polymer. The obtained polymer was separated by decantation, and sufficiently dried by vacuum-drying. Through this process, unreacted maleic anhydride and the solvent DNOP were removed.

Refined maleic anhydride-modified block copolymer was dissolved in deuterochloroform so as to prepare the solution of approximately 2 mass %, and the introduction rate of the acid anhydride group derived from the maleic anhydride to the polyisoprene block in the block copolymer was determined by a proton nuclear magnetic resonance spectroscopy ($^1$H-NMR). The peak derived from the acid anhydride group derived from the maleic anhydride was observed in 2.7 to 3.4 ppm, and from the integral ratio with the peak 6.1 to 7.23 ppm derived from the phenyl group in polystyrene, the peak 4.5 to 4.85 ppm derived from poly(3,4-isoprene), and the peak 4.85 to 5.4 ppm derived from poly(1,2-isoprene), the introduction rate of the acid anhydride group derived from maleic anhydride was estimated to be 10.5 mol %.

Also, the polymer was dissolved in tetrahydrofuran (hereinafter referred to as THF) so as to prepare the solution of approximately 0.5 mass %, and the measurement was conducted by a gel permeation chromatography (GPC). Incidentally, the measurement was conducted with THF as an effluent at the flow speed of 1 mL/min in the state three columns of TSK-GEL column 4000HHR from Tosoh Corporation were connected. It was confirmed that the cut-out in conjugated diene part scarcely occurred.

Also, the polymer was dissolved in THF so as to prepare the solution of approximately 8 mass %, 10 drops of the solution was dropped to a plate made of aluminum using a path tool pipette, the plate was placed still for 3 hours or more at a room temperature, and thereby the THF was evaporated. After that, the plate was dried using a vacuum drying machine for 3 hours or more to completely remove the solvent, and Fourier transform infrared reflection absorption spectroscopy (FT-IR) measurement was conducted for the obtained film. As a result, in the pre-maleic-anhydride-modified block copolymer, absorption was not confirmed in 1750 to 1900 cm$^{-1}$, but in the maleic anhydride-modified block copolymer, the absorption derived from the carbonyl group derived from maleic anhydride was confirmed in 1750 to 1900 cm$^{-1}$. Incidentally, used measurement device was an infrared spectrophotometer IR Prestige-21 (from Shimadzu Corporation) with an infrared microscope (AIM8800) from Shimadzu Corporation attached thereto.

[1-2] Second Step (Modification with Base)

The acid anhydride group derived from maleic anhydride in the obtained maleic anhydride-modified block copolymer (in which the introduction rate of the acid anhydride group derived from maleic anhydride was 10.5 mol %) had high reactivity, and thus it was presumed that it would react with monoamine compound to form a carboxylic acid group and an amide group (the functional group capable of forming a non-covalent bond). In a 250 mL container made of a tetrafluoroethylene-perfluoroalkylvinylether copolymer (hereinafter referred to as PFA), 8.00 g of the maleic anhydride-modified block copolymer was dissolved in 80.2 g of THF, and 742 mg of n-butylamine was further added thereto. At this time, the acid anhydride group and the n-butylamine were almost equimolar amount. Inside the PFA container was replaced with nitrogen, and the mixture was stirred on a hot plate at 50° C. in 300 rpm for approximately 13 hours. The solution after the reaction was transferred to a PFA container having the capacity of 128 mm*94 mm* 23 mm, and the container was placed still as it was at a room temperature for one and a half days to evaporate the THF solvent. After that, the solution was dried using a vacuum drying machine for approximately one day to completely remove the solvent. The obtained modified sample was in a film shape.

The obtained modified sample was dissolved in deuterochloroform so as to prepare the solution of approximately 2 mass %, $^1$H-NMR method was conducted thereto, and the peak intensity derived from the proton of a methylene group adjacent to the nitrogen atom in the amide group was observed in 3.0 to 3.3 ppm; thus, it was confirmed that the functional group capable of forming a non-covalent bond was introduced. Also, FT-IR measurement was conducted in the same manner as that prior to the modification with amine, and the absorption derived from the N—H stretching vibrations of the amide group in 3100 to 3600 cm$^{-1}$ not observed prior to the modification with amine was newly observed.

[1-3] Tensile Test

The obtained modified sample in a film shape was punched out using a punching blade mold, and a 4 mm width dog bone shaped test piece was prepared. The thickness of the test piece was approximately 0.60 mm. Measurement was conducted using a measurement device AGS-X, 50 N Load Cell and 50N clip-gripper from Shimadzu Corporation, with the distance between grippers being 9.8 mm, and the initial strain-rate of 0.33/s (tension rate of 3.2 mm/s). As the results of the tensile test, Young's modulus, maximum stress, breaking elongation and toughness were respectively 2.9 MPa, 10.0 MPa, 1580%, and 61 MJ/m$^3$. Incidentally, the Young's modulus was determined from the initial grade (within strain of 10%) of stress-strain curve, the maximum stress was determined from the maximum value of stress, the breaking elongation was determined from elongation when fracture occurred, and the toughness was determined from the inner area of stress-strain curve.

[1-4] Stress Relaxation Test

A modified sample in a film shape was punched out using a punching blade mold and a 4 mm width dog bone shaped test piece was prepared in the same manner as in 1-3 Tensile test. The thickness of the test piece was approximately 0.60 mm. The stress relaxation test was conducted with the distance between grippers being 8.7 mm, the initial strain-rate of 1.5/s (tension rate of 13 mm/s), and strain of 500% for 12 hours in the same manner as in the tensile test using a measurement device AGS-X, 50N Load Cell and 50N clip-gripper from Shimadzu Corporation. The test result is shown in FIG. 1. The stress right after strain reached at 500% was 2.2 MPa, and the stress dropped sharply to approximately 1 MPa after that. The stress gradually dropped and the stress after 8 hours passed and 12 hours passed was respectively 0.54 MPa and 0.53 MPa which was almost fixed and no fracture occurred.

Figure 2:
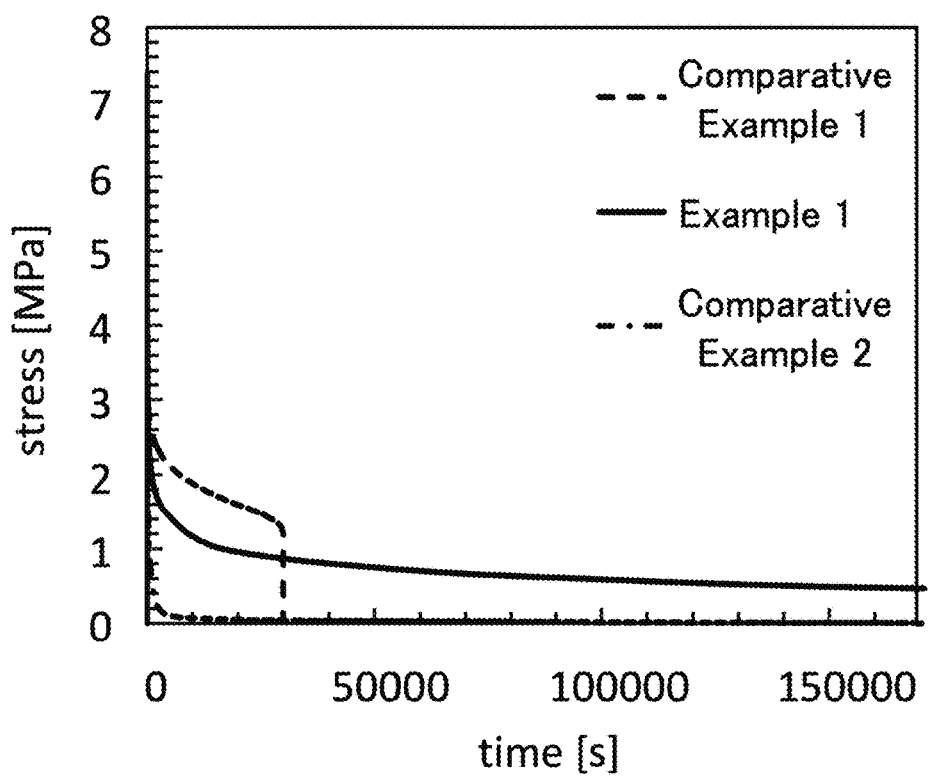
FIG. 2 is a graph showing the result of stress relaxation test with the strain of 1300% to Examples and Comparative Examples.

Also, an experiment was conducted in the same manner as in the stress relaxation test under the strain of 500% except that the thickness of the test piece was 0.66 mm, the distance between the grippers was 10.0 mm, the initial strain rate was 1.5/s (tensile rate of 15 mm/s), and the strain of 1300%. The test result is shown in FIG. 2. The stress right after strain reached at 1300% was 7.3 MPa. Also, the stress after 47 hours passed was 0.47 MPa, and no fracture occurred.

Figure 3:
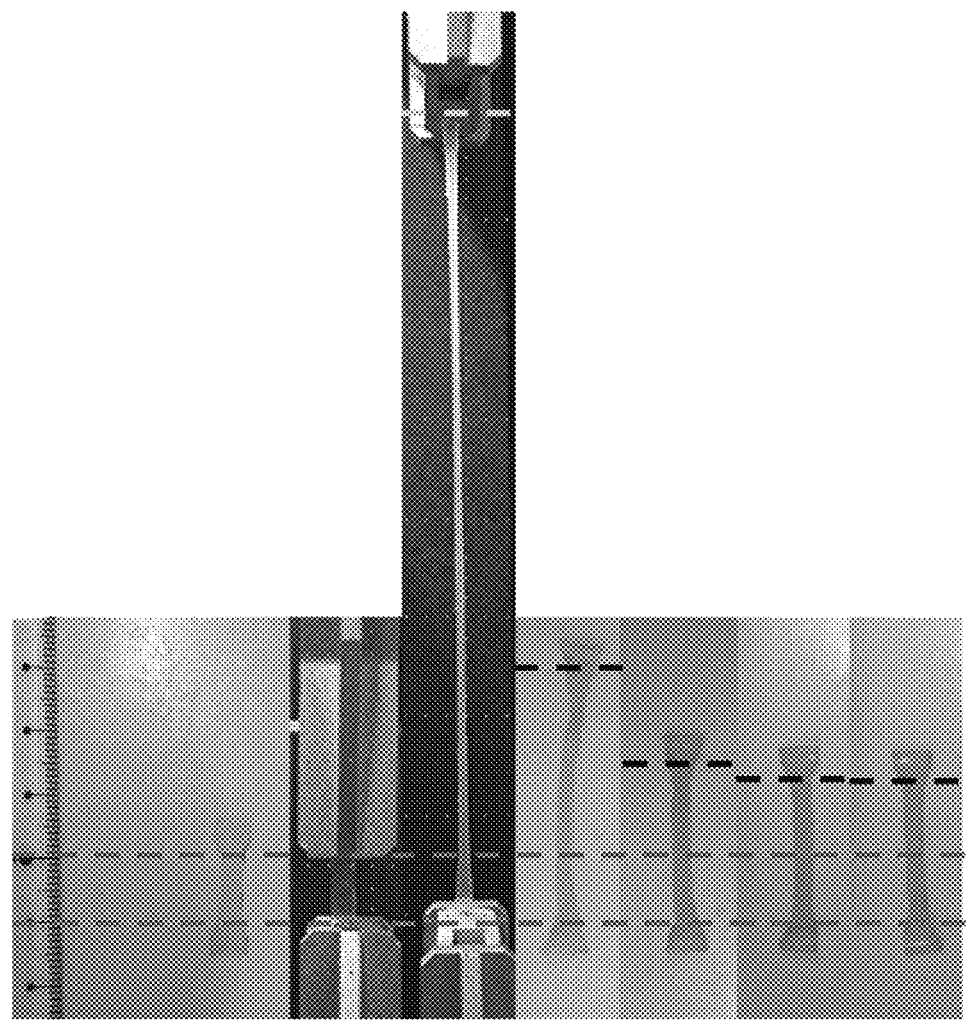
FIG. 3 is a photograph of the sample in Example 1 before and after being stretched.

FIG. 3 shows the state of the sample after stopping applying strain to the sample to which strain of 1300% was continuously applied for 47 hours. The length of the sample immediately snapped back to about 4.1 times of the distance between the grippers before stretching, right after stopping applying strain. The length snapped back to about 2.5 times of the distance between the grippers before stretching in 8 hours. Further, the length snapped back to about 2.3 times of the distance between the grippers before stretching in 30 hours. In 47 hours, the length was about the same (2.2 times) as that in 30 hours. It means that the recovery in 47 hours was 91%.

Example 2

In Example 2, the block copolymer of Production Example 2 (block copolymer composition containing styrene-isoprene-styrene triblock copolymer) is used as the block copolymer which is a base polymer, modification with maleic anhydride is conducted thereto in the same manner as in Example 1, and a modification with amine is further conducted thereto. In this Example also, it is confirmed that the functional group capable of forming a non-covalent bond is introduced.

Also, when the tensile test and the stress relaxation test are conducted in almost the same manner as in Example 1, it is confirmed that the same results as those of Example 1 is shown.

Comparative Example 1

In Comparative Example 1, the tensile test and the stress relaxation test were conducted to the block copolymer of Production Example 1 (block copolymer composition containing styrene-isoprene-styrene triblock copolymer).

As for the preparation of a film sample, the film sample was prepared in the same manner as in Example 1 except that the block copolymer of Production Example 1, which was a base polymer, and THF were respectively used in an amount of 8.00 g and 80.4 g.

The obtained film sample was punched out using a punching blade mold, a 4 mm width dog bone shaped test piece (film thickness: approximately 0.72 mm) was prepared, and the tensile test was conducted with the distance between the grippers being 9.0 mm and the initial strain-rate being 0.33/s (tension rate of 3.0 mm/s). As the results of the tensile test, Young's modulus, maximum stress, breaking elongation and toughness were respectively 2.8 MPa, 9.0 MPa, 1930%, and 62 MJ/m$^3$.

Meanwhile, the obtained film sample was punched out using a punching blade mold, a 4 mm width dog bone shaped test piece (thickness: 0.57 mm) was prepared, and the stress relaxation test was conducted with the distance between the grippers being 9.9 mm and the initial strain-rate being 1.5/s (tension rate of 15 mm/s), and the strain of 500% (FIG. 1); as the result, the stress right after the strain reached at 500% was 1.8 MPa, which was smaller than the stress in Example 1. This is presumed to be because apparent crosslinking density increased for the non-covalent bond to be present after the modification. After that, the stress decreased but it was not so dropped largely compared to Example 1. Also, the stress after 8 hours passed, and 12 hours passed was respectively 0.89 MPa and 0.81 MPa.

Further, a stress relaxation test with the thickness of the test piece being 0.66 mm, the distance between the grippers being 10.7 mm, the initial strain rate being 1.5/s (tension rate of 16 mm/s), and the strain of 1300% was also conducted (FIG. 2); as the result, the stress right after the strain reached at 1300% was 4.3 MPa, and after that, although the stress gradually decreased, the sample was broken when 8.3 hours passed. In Example 1, under the fixed stress, stress concentration to the polystyrene domain was avoided by causing bond and dissociation of the non-covalent bond repeatedly; however, the non-covalent bond was not present in the base polymer and thus it was presumed that the stress was constantly applied to the polystyrene domain, which finally caused polystyrene chains to gradually fell out from the domain to cause breakdown.

Comparative Example 2

In Comparative Example 2, the block copolymer of Production Example 3 (block copolymer composition mainly composed of styrene-isoprene diblock copolymer) was used as the block copolymer which was a base polymer, modification with maleic anhydride was conducted thereto, and a modification treatment with amine was further conducted thereto. Specific procedures are shown below.

[2-1] First Step (Modification with Maleic Anhydride)

The base polymer: the block copolymer of Production Example 3, the age resistor 6PPD, and the solvent having a high boiling point DNOP, were respectively weighed so as to be 20.0 g, 40.6 mg, and 89.9 g, and mixed in a round bottom flask at a room temperature and stirred by a mechanical stirrer for 18 hours. After that, the mixture was stirred in an oil bath at 100° C. for 3.5 hours and thereby a solution was prepared. Maleic anhydride of 10.0 g was added to the solution, and inside the flask was replaced with nitrogen, and then the mixture was stirred in an oil bath at 100° C. for 10 minutes, and thereby a reaction solution was prepared. After the maleic anhydride was completely dissolved, the flask was moved to an oil bath at about 182° C. and the mixture was stirred for 50 minutes to carry out the reaction. After that, the flask was taken out from the oil bath and the reaction was terminated.

Toluene of 180 mL was added to the solution, and this solution was dropped to acetonitrile of 2750 mL to precipitate a block copolymer modified with the maleic anhydride. The obtained polymer was separated by decantation, sufficiently dried by vacuum-drying, then dissolved in the toluene again, and dropped to the acetonitrile to precipitate a polymer. The obtained polymer was separated by decantation, and sufficiently dried by vacuum-drying. Through this process, unreacted maleic anhydride and the solvent DNOP were removed.

Refined maleic anhydride-modified block copolymer was dissolved in deuterochloroform so as to prepare the solution of approximately 2 mass %, and the introduction rate of the acid anhydride group derived from the maleic anhydride to the polyisoprene block in the block copolymer was determined by a proton nuclear magnetic resonance spectroscopy ($^1$H-NMR). The peak derived from the acid anhydride group derived from the maleic anhydride was observed in 2.7 to 3.4 ppm, and from the integral ratio with the peak 6.1 to 7.23 ppm derived from the phenyl group in polystyrene, the peak 4.5 to 4.85 ppm derived from poly(3,4-isoprene), and the peak 4.85 to 5.4 ppm derived from poly(1,2-isoprene), the introduction rate of the acid anhydride group derived from maleic anhydride was estimated to be 9.6 mol %.

Also, the polymer was dissolved in THF so as to prepare the solution of approximately 0.5 mass %, and the measurement was conducted by a gel permeation chromatography (GPC) in the same manner as in Example 1. It was confirmed that the cut-out in conjugated diene part scarcely occurred.

Also, the polymer was dissolved in THF so as to prepare the solution of approximately 8 mass %, 10 drops of the solution was dropped to a plate made of aluminum using a path tool pipette, the plate was placed still for 3 hours or more at a room temperature, and thereby the THF was evaporated. After that, the plate was dried using a vacuum drying machine for 3 hours or more to completely remove the solvent, and Fourier transform infrared reflection absorption spectroscopy (FT-IR) measurement was conducted for the obtained film. As a result, in the pre-maleic-anhydride-modified block copolymer, absorption was not confirmed in 1750 to 1900 $cm^{-1}$, but in the maleic anhydride-modified block copolymer, the absorption derived from the carbonyl group derived from maleic anhydride was confirmed in 1750 to 1900 $cm^{-1}$. Incidentally, used measurement device was the same as that in Example 1.

[2-2] Second Step (Modification with Base)

The acid anhydride group derived from maleic anhydride in the maleic anhydride-modified block copolymer (in which the introduction rate of the acid anhydride group derived from maleic anhydride was 9.6 mol %) had high reactivity, and thus it was presumed that it would react with monoamine compound to form a carboxylic acid group and an amide group (the functional group capable of forming a non-covalent bond). In a 250 mL container made of PFA, 8.02 g of the maleic anhydride-modified block copolymer was dissolved in 81.4 g of THF, and 699 mg of n-butylamine was further added thereto. At this time, the acid anhydride group and the n-butylamine were almost equimolar amount. Inside the PFA container was replaced with nitrogen, and the mixture was stirred on a hot plate at 50° C. in 300 rpm for approximately 13 hours. The solution after the reaction was transferred to a PFA container having the capacity of 128 mm*94 mm*23 mm, and the container was placed still as it was at a room temperature for one and a half days to evaporate the THF solvent. After that, the solution was dried using a vacuum drying machine for approximately one day to completely remove the solvent. The obtained modified sample was in a film shape.

The obtained modified sample was dissolved in deuterochloroform so as to prepare the solution of approximately 2 mass %, $^1$H-NMR method was conducted thereto, and the peak intensity derived from the proton of a methylene group adjacent to the nitrogen atom in the amide group was observed in 3.0 to 3.3 ppm; thus, it was confirmed that the functional group capable of forming a non-covalent bond was introduced. Also, FT-IR measurement was conducted in the same manner as that prior to the modification with amine, and the absorption derived from the N—H stretching vibrations of the amide group in 3100 to 3600 $cm^{-1}$ not observed prior to the modification with amine was newly observed.

[2-3] Tensile Test

The obtained modified sample in a film shape was punched out using a punching blade mold, and a 4 mm width dog bone shaped test piece was prepared. The thickness of the test piece was approximately 0.57 mm. A tensile test was conducted with the distance between the grippers being 9.5 mm and the initial strain-rate being 0.33/s (tension rate of 3.1 mm/s). As the results of the tensile test, Young's modulus, maximum stress, breaking elongation and toughness were respectively 0.93 MPa, 2.6 MPa, 1750%, and 21 $MJ/m^3$.

[2-4] Stress Relaxation Test

The obtained modified sample in a film shape was punched out using a punching blade mold in the same manner as in 2-3 Tensile test, and a 4 mm width dog bone shaped test piece was prepared. The thickness of the test piece was approximately 0.57 mm. The stress relaxation test was conducted with the distance between grippers being 9.1 mm, the initial strain-rate of 1.5/s (tension rate of 14 mm/s), and strain of 500% for 12 hours in the same manner as in the tensile test using a measurement device AGS-X, 50N Load Cell and 50N clip-gripper from Shimadzu Corporation. The test result is shown in FIG. 1. The stress right after strain reached at 500% was 1.1 MPa, and the stress dropped sharply to approximately 0.2 MPa after that. The stress gradually dropped and the stress after 8 hours passed and 12 hours passed was respectively 0.040 MPa and 0.032 MPa which was almost fixed and no fracture occurred.

Also, an experiment was conducted in the same manner as in the stress relaxation test under the strain of 500% except that the thickness of the test piece was 0.70 mm, the distance between the grippers was 8.4 mm, the initial strain rate was 1.5/s (tensile rate of 13 mm/s), and the strain of 1300%. The test result is shown in FIG. 2. The stress right after strain reached at 1300% was 5.5 MPa. Also, the stress after 47 hours passed was 0.004 MPa, and no fracture occurred.

Figure 4:
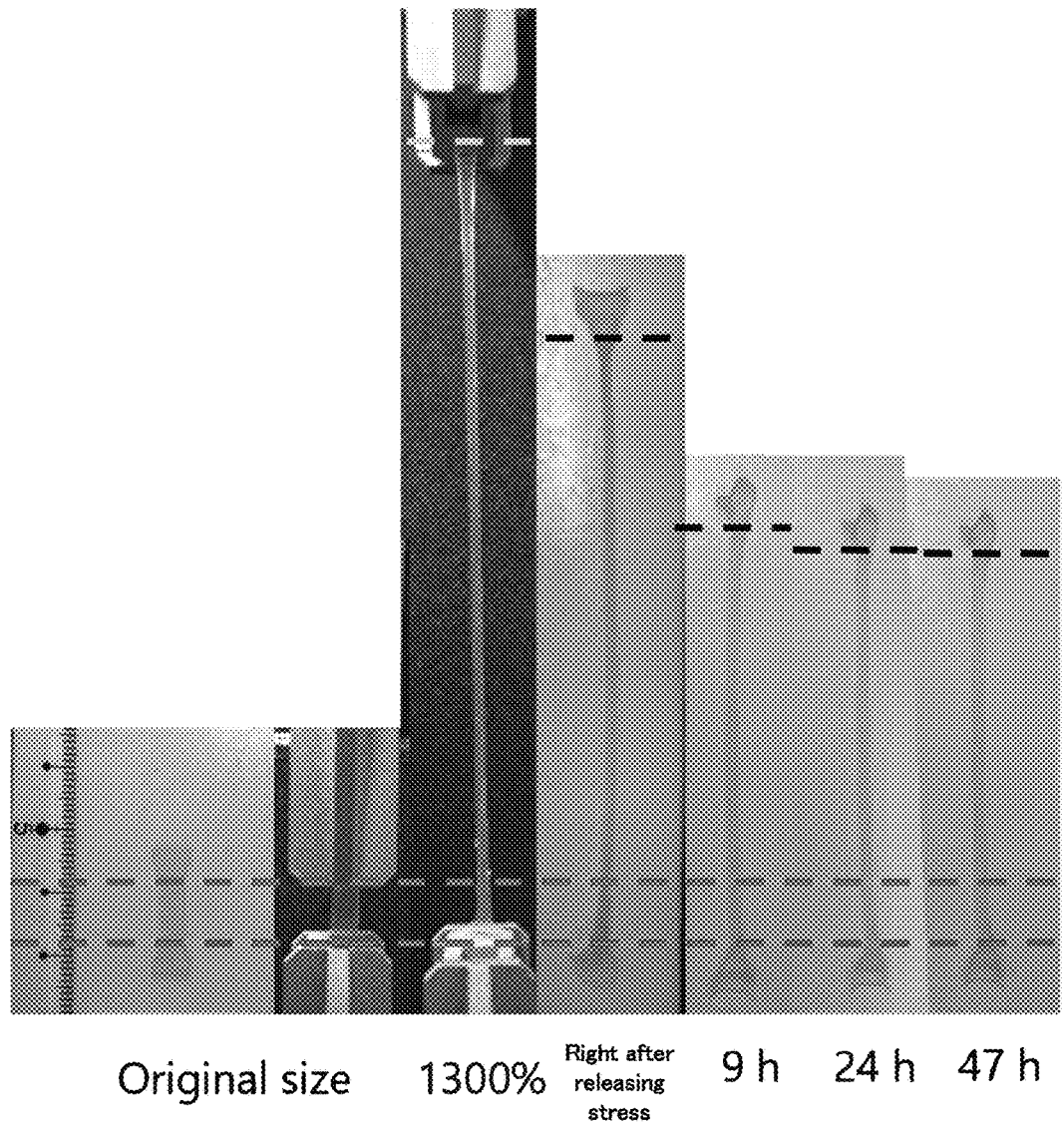
FIG. 4 is a photograph of the sample in Comparative Example 2 before and after being stretched.

FIG. 4 shows the state of the sample after stopping applying strain to the sample to which strain of 1300% was continuously applied for 47 hours. The length of the sample immediately snapped back to about 10.9 times of the distance between the grippers before stretching, right after stopping applying strain. The length snapped back to about 7.5 times of the distance between the grippers before stretching in 9 hours. Further, the length snapped back to about 7.1 times of the distance between the grippers before stretching in 24 hours. The length snapped back to about 7 times of the distance between the grippers before stretching in 47 hours. It means that the recovery in 47 hours was 54%. In this manner, the recovery of strain was smaller in the series including just the diblock copolymer compared to the series including the triblock copolymer (Example 1). This is presumed to be because, when strain was applied for a long time, a nano phase separation structure more easily fell apart in the case of just the diblock copolymer compared to the case of including the triblock copolymer since just the one side of the polymer chain was not joined with glass styrene domain.

Reference Example

In Reference Example, a tensile test and a stress relaxation test were conducted to the block copolymer of Production Example 3 (block copolymer composition mainly composed of styrene-isoprene diblock copolymer).

As for the preparation of a film sample, the film sample was prepared in the same manner as in Example 1 except that the block copolymer of Production Example 3, which was a base polymer, and THF were respectively used in an amount of 8.03 g and 80.9 g.

The obtained film sample was punched out using a punching blade mold, a 4 mm width dog bone shaped test piece (film thickness: approximately 0.97 mm) was prepared, and the tensile test was conducted with the distance between the grippers being 10.5 mm and the initial strain-rate being 0.33/s (tension rate of 3.5 mm/s). As the results of the tensile test, Young's modulus, maximum stress, breaking elongation and toughness were respectively 1.6 MPa, 0.34 MPa, 140%, and 0.40 $MJ/m^3$; the film hardly stretched. This was because the block copolymer of Production Example 3 was mainly composed of the diblock copolymer and the polystyrene domain generated from the nano phase separation structure was not joined with the polyisoprene block.

Also, since the breaking elongation of the block copolymer of Production Example 3 (block copolymer composition mainly composed of styrene-isoprene diblock copolymer) itself was 140%, a stress relaxation test in the same conditions (under the fixed strain of 500% and 1300%) as those in other Examples and Comparative Examples could not be conducted.

The invention claimed is:

1. A multi-block copolymer composition obtained by a modification treatment, the composition comprising: a block copolymer B formed by introducing a functional group capable of forming a non-covalent bond to a block copolymer A; wherein
the block copolymer A includes a block copolymer A1 represented by the following formula I, and optionally a block copolymer A2 represented by the following formula II; and
a mass ratio (A1/A2) of the block copolymer A1 and the block copolymer A2 is 100/0 to 50/50:

$$(Ar^a\text{-}D_a)_n\text{-}X \quad (I)$$

$$Ar^b\text{-}D^b \quad (II)$$

in the formulas, $Ar^a$ and $Ar^b$ each represents an aromatic vinyl polymer block of which weight average molecular weight is 3,000 to 25,000; $D^a$ represents a conjugated diene polymer block of which vinyl bond content is 0.1 mol % to 50 mol % and weight average molecular weight is 5,000 to 250,000; $D^b$ represents a conjugated diene polymer block of which vinyl bond content is 0.1 mol % to 50 mol % and weight average molecular weight is 5,000 to 500,000; X represents a single bond or a residue of a coupling agent; and n is an integer of 2 or more.

2. The multi-block copolymer composition according to claim 1, wherein the block copolymer A further includes a block copolymer A3 represented by the following formula III:

$$Ar1^c\text{-}D^c\text{-}Ar2^c \quad (III)$$

in the formula, $Ar1^c$ represents an aromatic vinyl polymer block of which weight average molecular weight is 3,000 to 25,000; $Ar2^c$ represents an aromatic vinyl polymer block of which weight average molecular weight is 30,000 to 300,000; and $D^c$ represents a conjugated diene polymer block of which vinyl bond content is 0.1 mol % to 50 mol % and weight average molecular weight is 10,000 to 500,000.

3. The multi-block copolymer composition according to claim 2, wherein a mass ratio [(A1+A3)/A2] of the block copolymer A1, the block copolymer A2, and the block copolymer A3 is 100/0 to 50/50.

4. The multi-block copolymer composition according to claim 1, wherein the functional group capable of forming a non-covalent bond is a group formed by bringing an amine compound into reaction with an acid anhydride group introduced to the block copolymer A.

5. The multi-block copolymer composition according to claim 1, wherein an introduction rate of the functional group capable of forming a non-covalent bond in the block copolymer B per 100 mol % of a conjugated diene monomer unit in the block copolymer B is 2.5 mol % to 25 mol %.

6. A film comprising 0 to 40 parts by mass of an aromatic vinyl polymer and 0 to 20 parts by mass of a polyolefin-based thermoplastic resin per 100 parts by mass of the multi-block copolymer composition according to claim 1.

7. The film according to claim 6, wherein, when the film is stretched to 1300% strain and kept as it is for 47 hours, then a tensile load thereto is released, and left as it is for 47 hours, a recovery of the film is 60% or more.

* * * * *